United States Patent
Niewiadomski et al.

(10) Patent No.: US 11,208,146 B2
(45) Date of Patent: Dec. 28, 2021

(54) ACCEPTABLE ZONE FOR AUTOMATED HITCHING WITH SYSTEM PERFORMANCE CONSIDERATIONS

(71) Applicant: Ford Global Technologies, LLC, Dearborn, MI (US)

(72) Inventors: Luke Niewiadomski, Dearborn, MI (US); Kyle Simmons, New Boston, MI (US); Li Xu, Northville, MI (US); Douglas Rogan, Mountain View, CA (US)

(73) Assignee: Ford Global Technologies, LLC, Dearborn, MI (US)

( * ) Notice: Subject to any disclaimer, the term of this patent is extended or adjusted under 35 U.S.C. 154(b) by 244 days.

(21) Appl. No.: 16/418,116

(22) Filed: May 21, 2019

(65) Prior Publication Data

US 2020/0369320 A1 Nov. 26, 2020

(51) Int. Cl.
*B62D 15/02* (2006.01)
*B60W 50/16* (2020.01)
*B62D 6/00* (2006.01)
*B60W 10/20* (2006.01)
*B60W 50/00* (2006.01)

(52) U.S. Cl.
CPC ......... *B62D 15/0295* (2013.01); *B60W 10/20* (2013.01); *B60W 50/16* (2013.01); *B62D 6/007* (2013.01); *B62D 15/0265* (2013.01); *B60W 2050/0068* (2013.01)

(58) Field of Classification Search
CPC ................................................ B62D 15/0295
See application file for complete search history.

(56) References Cited

U.S. PATENT DOCUMENTS

| | | |
|---|---|---|
| 7,204,504 B2 | 4/2007 | Gehring et al. |
| 7,568,716 B2 | 8/2009 | Dietz |
| 8,191,915 B2 * | 6/2012 | Freese, V ............... B60D 1/58 280/477 |
| 8,451,107 B2 | 5/2013 | Lu et al. |
| 9,374,562 B2 * | 6/2016 | Trombley .............. B60Q 9/005 |
| 9,563,951 B2 * | 2/2017 | Okouneva .............. G06T 7/579 |
| 9,696,723 B2 | 7/2017 | Zeng et al. |
| 9,834,140 B2 * | 12/2017 | Windeler ............... H04N 7/183 |

(Continued)

FOREIGN PATENT DOCUMENTS

| | | |
|---|---|---|
| DE | 102010004920 A1 | 7/2011 |
| DE | 102012001380 A1 | 8/2012 |
| EP | 2682329 A1 | 1/2014 |

*Primary Examiner* — Michael A Berns
(74) *Attorney, Agent, or Firm* — Raymond Coppiellie; Price Heneveld LLP

(57) ABSTRACT

A vehicle hitching assistance system including a controller determining a trailer target area to a rear of the vehicle. The trailer target area is positioned within left and right lateral vehicle steering limits, defined in a lateral direction between left and right boundaries respectively spaced inwardly of the left and right lateral vehicle steering limits by one of a system perception factor or a vehicle geometry factor, and defined in a longitudinal direction between a minimum movement limit and a maximum perception limit. The controller further identifies a trailer coupler within the trailer target area and outputs a steering signal to the vehicle to cause the vehicle to steer to align a hitch ball of the vehicle with the coupler during movement of the vehicle.

20 Claims, 19 Drawing Sheets

(56) References Cited

U.S. PATENT DOCUMENTS

| | | |
|---|---|---|
| 9,854,209 B2 * | 12/2017 | Aich .............. B60W 30/18036 |
| 9,934,572 B2 | 4/2018 | Hu et al. |
| 2004/0032321 A1 | 2/2004 | McMahon et al. |
| 2005/0074143 A1 | 4/2005 | Kawai |
| 2010/0039515 A1 | 2/2010 | Dietz |
| 2010/0096203 A1 * | 4/2010 | Freese, V ................ B60D 1/58 180/167 |
| 2012/0191285 A1 | 7/2012 | Woolf et al. |
| 2013/0226390 A1 | 8/2013 | Luo et al. |
| 2014/0218506 A1 | 8/2014 | Trombley et al. |
| 2014/0267688 A1 | 9/2014 | Aich et al. |
| 2014/0347486 A1 | 11/2014 | Okouneva |
| 2015/0002669 A1 | 1/2015 | Reed et al. |
| 2015/0115571 A1 | 4/2015 | Zhang et al. |
| 2016/0023601 A1 | 1/2016 | Windeler |
| 2016/0052548 A1 | 2/2016 | Singh et al. |

\* cited by examiner

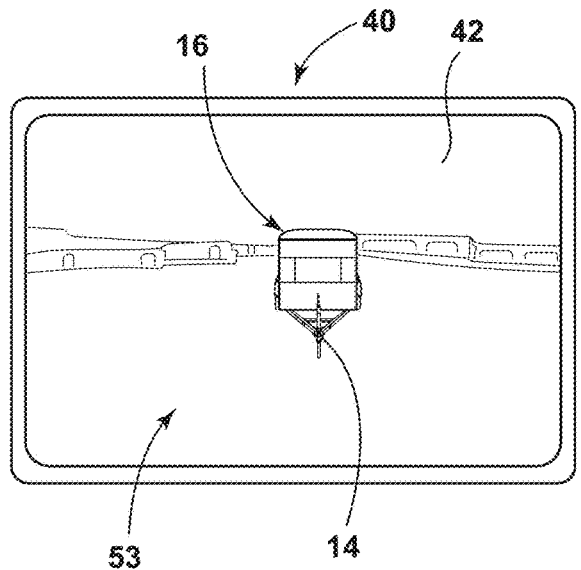 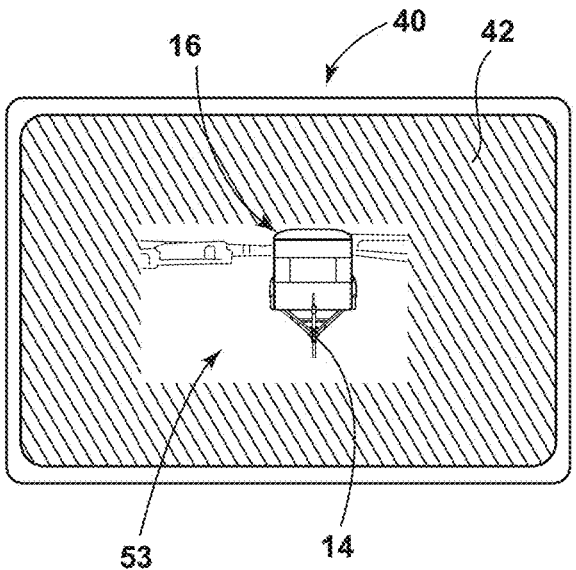
FIG. 11A  FIG. 11B
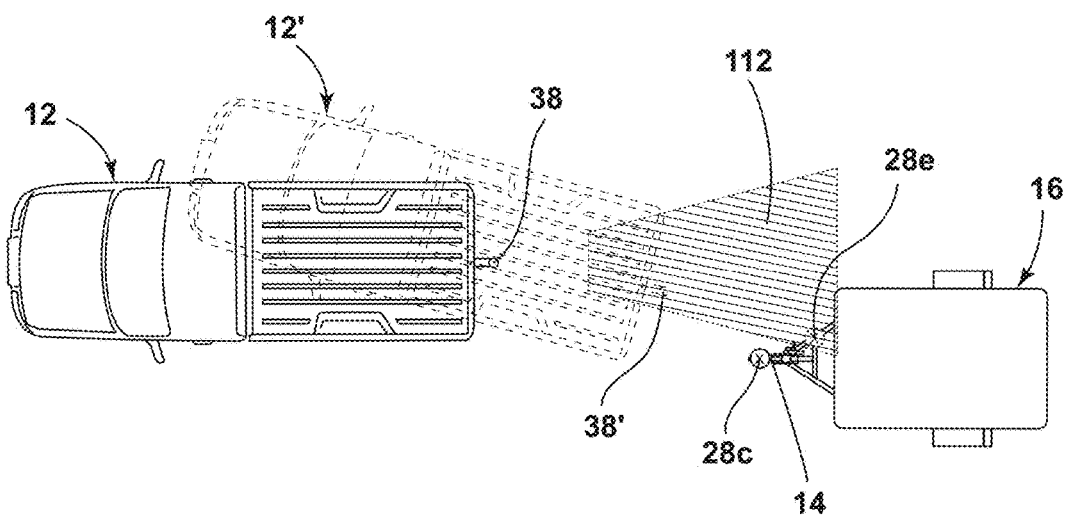
FIG. 12

ACCEPTABLE ZONE FOR AUTOMATED HITCHING WITH SYSTEM PERFORMANCE CONSIDERATIONS

FIELD OF THE INVENTION

The present invention generally relates to a vehicle hitch assistance system. In particular, the system provides the user with various options for assisting in hitching a vehicle with a trailer and targets for initial alignment of the vehicle prior to assistance in hitching.

BACKGROUND OF THE INVENTION

Hitching a trailer to a vehicle can be a difficult and time-consuming experience. In particular, aligning a vehicle hitch ball with the desired trailer hitch can, depending on the initial location of the trailer relative to the vehicle, require repeated forward and reverse driving coordinated with multiple steering maneuvers to appropriately position the vehicle. Further, through a significant portion of the driving needed for appropriate hitch ball alignment, the trailer hitch cannot be seen, and the hitch ball can, under ordinary circumstance, never actually be seen by the driver. This lack of sight lines requires inference of the positioning of the hitch ball and hitch based on experience with a particular vehicle and trailer, and can still require multiple instances of stopping and stepping out of the vehicle to confirm alignment or to note an appropriate correction for a subsequent set of maneuvers. Even further, the closeness of the hitch ball to the rear bumper of the vehicle means that any overshoot can bring the vehicle into contact with the trailer. Accordingly, further advancements may be desired.

SUMMARY OF THE INVENTION

According to one aspect of the present invention, a vehicle hitching assistance system includes a controller determining a trailer target area to a rear of the vehicle. The trailer target area is positioned within left and right lateral vehicle steering limits, defined in a lateral direction between left and right boundaries respectively spaced inwardly of the left and right lateral vehicle steering limits by one of a system perception factor or a vehicle geometry factor, and defined in a longitudinal direction between a minimum movement limit and a maximum perception limit. The controller further identifies a trailer coupler within the trailer target area and outputs a steering signal to the vehicle to cause the vehicle to steer to align a hitch ball of the vehicle with the coupler during movement of the vehicle.

Embodiments of the first aspect of the invention can include any one or a combination of the following features:
 the steering signal is further output to the vehicle to cause the vehicle to steer to align a hitch ball of the vehicle with the coupler during movement of the vehicle in a single reversing maneuver;
 the left and right lateral vehicle steering limits are equal to left and right steering path limits of the vehicle;
 the left and right boundaries respectively spaced inwardly of the left and right lateral vehicle steering limits by the vehicle geometry factor by the left and right boundaries being defined along straight left and right vehicle backing paths at respective left and right vehicle heading angles corresponding with respective left and right swingout limits for the vehicle;
 the left and right swingout limits are of equal distances on opposite lateral sides of a centerline of the vehicle;
 the left and right swingout limits are based on a front corner position of the vehicle relative to a steering center of the vehicle at a maximum steering angle;
 the left and right swingout limits are adjustable;
 the left and right swingout limits are determined by the controller using data from one or more proximity sensors associated with the vehicle;
 the left and right boundaries respectively spaced inwardly of the left and right lateral vehicle steering limits by the system perception factor by the left and right boundaries corresponding with left and right steering paths at a steering angle less than a maximum steering angle by a predetermined factor;
 the predetermined factor is determined to reduce a computational load on the controller;
 the system further includes an imaging system mounted with and directed toward the rear of the vehicle, the controller further acquires image data from the vehicle, and the trailer target area is identified within the image data and is less than a total field of the image data;
 the maximum perception limit correspond with a limits of the controller in identifying the trailer coupler within the image data, and the minimum movement limit corresponds with a distance over which the vehicle must move to cause the vehicle to steer to align a hitch ball of the vehicle with the coupler during movement of the vehicle;
 the controller further outputs a video image displayable on a human-machine interface within the vehicle including an image to the rear of the vehicle and a graphic overlay of the target area on the image data in a proportionally correlated manner with the image data;
 the graphic overlay further includes an indication of whether a detected coupler is within the target area; and
 while outputting a steering signal to the vehicle to cause the vehicle to steer to align a hitch ball of the vehicle with the coupler during movement of the vehicle, the controller monitors a position of the coupler to determine if the coupler moves to a position beyond either of the left or right vehicle steering limits, and stops the vehicle if the coupler moves to a position beyond either of the left or right vehicle steering limits when a distance to the coupler is above a predetermined threshold.

According to another aspect of the present invention, a vehicle hitching assistance system includes a controller identifying a trailer coupler within a trailer target area to the rear of the vehicle and outputting a steering signal to the vehicle to cause the vehicle to steer to align a hitch ball of the vehicle with the coupler during movement of the vehicle. Steering to align the hitch ball of the vehicle with the coupler includes monitoring a position of the coupler to determine if the coupler moves to a position beyond either of a left or a right vehicle steering limit and stopping the vehicle if the coupler moves to a position beyond either of the left or right vehicle steering limits;

According to another aspect of the present invention, a method for assisting a vehicle in hitching with a trailer includes identifying a trailer coupler within a specified area relative to the vehicle, the specified area being defined between a maximum distance and a minimum distance from a rear of the vehicle and boundaries respectively spaced inwardly of respective left and right lateral vehicle steering limits by one of a system perception factor or a vehicle geometry factor and outputting a steering signal to the vehicle to cause the vehicle to steer to align a hitch ball of the vehicle with the coupler. Causing the vehicle to steer to align a hitch ball of the vehicle with the coupler includes monitoring a position of the coupler to determine if the coupler moves to a position beyond either of a left or a right vehicle steering limit and stopping the vehicle if the coupler moves to a position beyond either of the left or right vehicle steering limits.

These and other aspects, objects, and features of the present invention will be understood and appreciated by those skilled in the art upon studying the following specification, claims, and appended drawings.

BRIEF DESCRIPTION OF THE DRAWINGS

In the drawings:

FIG. 11A is an illustration of image data received from a vehicle camera in the system of FIG. 2;

FIG. 11B is an illustration of limited portion of the image data that can be used for a trailer detection routine in the system of FIG. 2;

FIG. 12 is an overhead schematic depiction of an erroneous coupler detection resulting in a vehicle coupler becoming unreachable in a reversing maneuver;

DETAILED DESCRIPTION OF THE PREFERRED EMBODIMENTS

Figure 1:
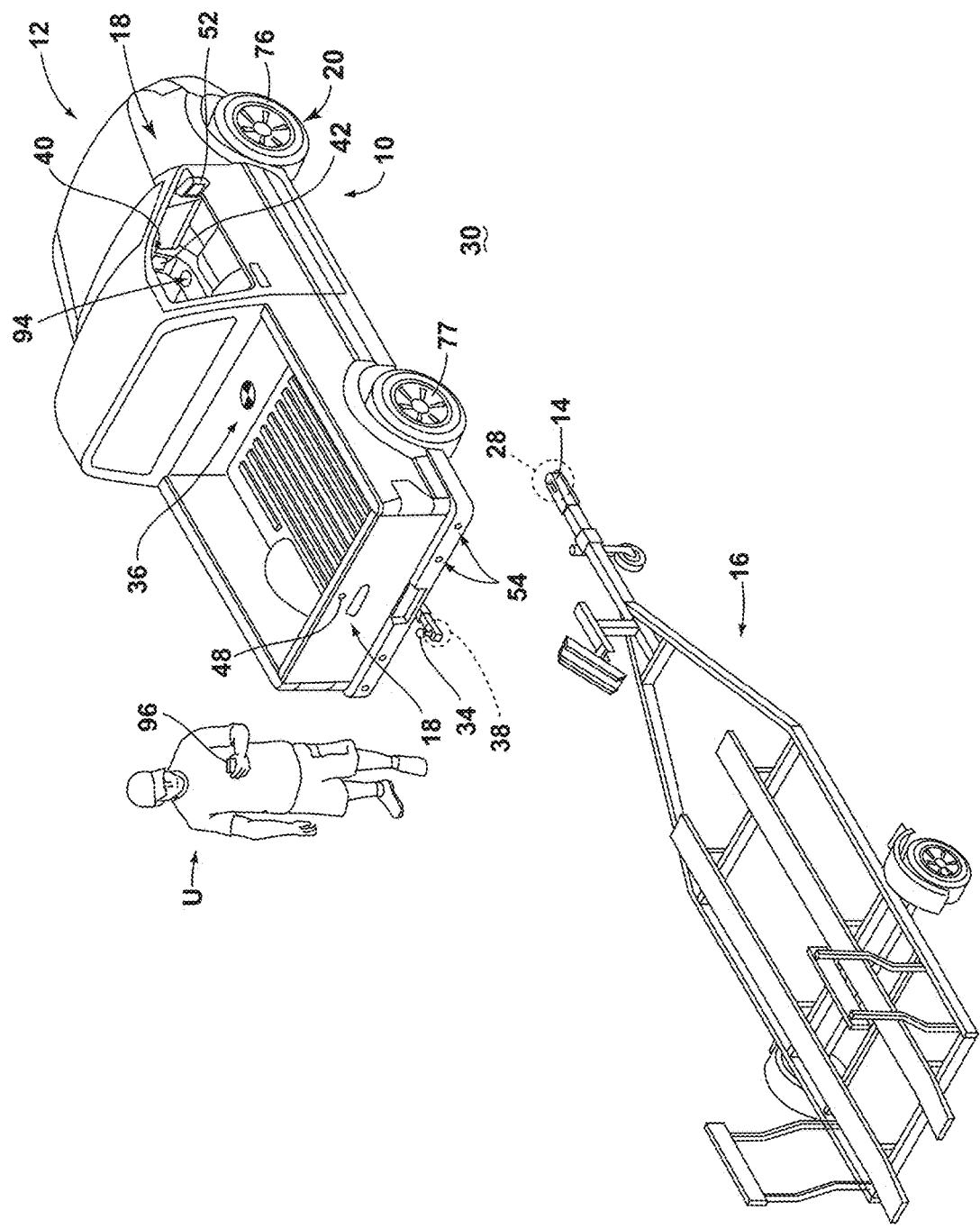
FIG. 1 is a perspective view of a vehicle in an unhitched position relative to a trailer.

For purposes of description herein, the terms "upper," "lower," "right," "left," "rear," "front," "vertical," "horizontal," "interior," "exterior," and derivatives thereof shall relate to the device as oriented in FIG. 1. However, it is to be understood that the device may assume various alternative orientations, except where expressly specified to the contrary. It is also to be understood that the specific devices and processes illustrated in the attached drawing, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise. Additionally, unless otherwise specified, it is to be understood that discussion of a particular feature of component extending in or along a given direction or the like does not mean that the feature or component follows a straight line or axis in such a direction or that it only extends in such direction or on such a plane without other directional components or deviations, unless otherwise specified.

Referring generally to FIGS. 1-6, reference numeral 10 designates a hitch assistance system (also referred to as a "hitch assist" system or a "hitching assistance" system) for a vehicle 12. In particular, hitch assistance system 10 includes a controller 26 determining a trailer target area 112 to a rear of the vehicle 12. The trailer target area 112 is positioned within left and right lateral vehicle steering limits L1,L2, defined in a lateral direction between left and right boundaries B1,B2 respectively spaced inwardly of the left and right lateral vehicle steering limits L1,L2 by one of a system perception factor or a vehicle geometry factor. The target area 112 is further defined in a longitudinal direction between a minimum movement limit R2 and a maximum perception limit R1. The controller 26 further identifies a trailer 16 coupler 14 within the trailer target area 112 and outputs a steering signal to the vehicle 12 to cause the vehicle 12 to steer to align a hitch ball 38 of the vehicle 12 with the coupler 14 during movement of the vehicle 12.

Figure 2:
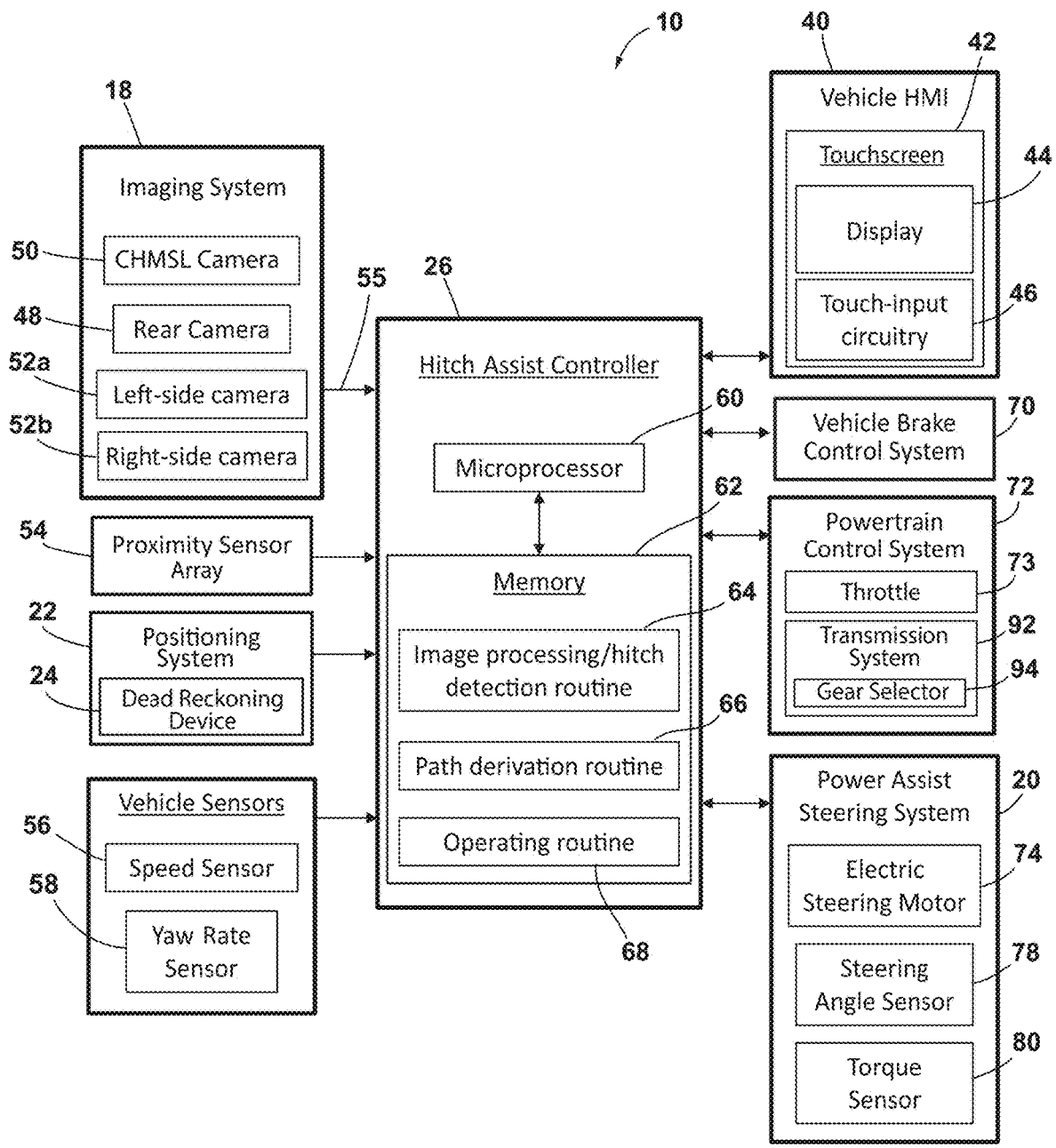
FIG. 2 is a diagram of a system according to an aspect of the disclosure for assisting in aligning the vehicle with a trailer in a position for hitching the trailer to the vehicle.

With respect to the general operation of the hitch assist system 10, as illustrated in the system diagram of FIG. 2, system 10 includes various sensors and devices that obtain or otherwise provide vehicle status-related information. This information includes positioning information from a positioning system 22, which may include a dead reckoning device 24 or, in addition or as an alternative, a global positioning system (GPS), to determine a coordinate location of the vehicle 12 based on the one or more locations of the devices within the positioning system 22. In particular, the dead reckoning device 24 can establish and track the coordinate location of the vehicle 12 within a localized coordinate system 82 based at least on vehicle speed and steering angle δ. Other vehicle information received by hitch assist system 10 may include a speed of the vehicle 12 from a speed sensor 56 and a yaw rate of the vehicle 12 from a yaw rate sensor 58. It is contemplated that in additional embodiments, a proximity sensor 54 or an array thereof, and other vehicle sensors and devices may provide sensor signals or other information, such as sequential images of a trailer 16, including the detected coupler 14, that the controller 26 of the hitch assist system 10 may process with various routines to determine the height H and position of coupler 14.

As further shown in FIG. 2, one embodiment of the hitch assist system 10 is in communication with the steering system 20 of vehicle 12, which may be a power assist steering system 20 including an electric steering motor 74 to operate the steered wheels 76 (FIG. 1) of the vehicle 12 for moving the vehicle 12 in such a manner that the vehicle yaw changes with the vehicle velocity and the steering angle δ. In the illustrated embodiment, the power assist steering system 20 is an electric power-assisted steering ("EPAS") system including electric steering motor 74 for turning the steered wheels 76 to a steering angle δ based on a steering command, whereby the steering angle δ may be sensed by a steering angle sensor 78 of the power assist steering system 20. The steering command 69 may be provided by the hitch assist system 10 for autonomously steering during a trailer hitch alignment maneuver and may alternatively be provided manually via a rotational position (e.g., steering wheel angle) of a steering wheel of vehicle 12. However, in the illustrated embodiment, the steering wheel of the vehicle 12 is mechanically coupled with the steered wheels 76 of the vehicle 12, such that the steering wheel moves in concert with steered wheels 76, preventing manual intervention with the steering wheel during autonomous steering. More specifically, a torque sensor 80 is provided on the power assist steering system 20 that senses torque on the steering wheel that is not expected from autonomous control of the steering wheel and therefore indicative of manual intervention, whereby the hitch assist system 10 may alert the driver to discontinue manual intervention with the steering wheel and/or discontinue autonomous steering. In alternative embodiments, some vehicles have a power assist steering system 20 that allows a steering wheel to be partially decoupled from movement of the steered wheels 76 of such a vehicle.

Figure 3:
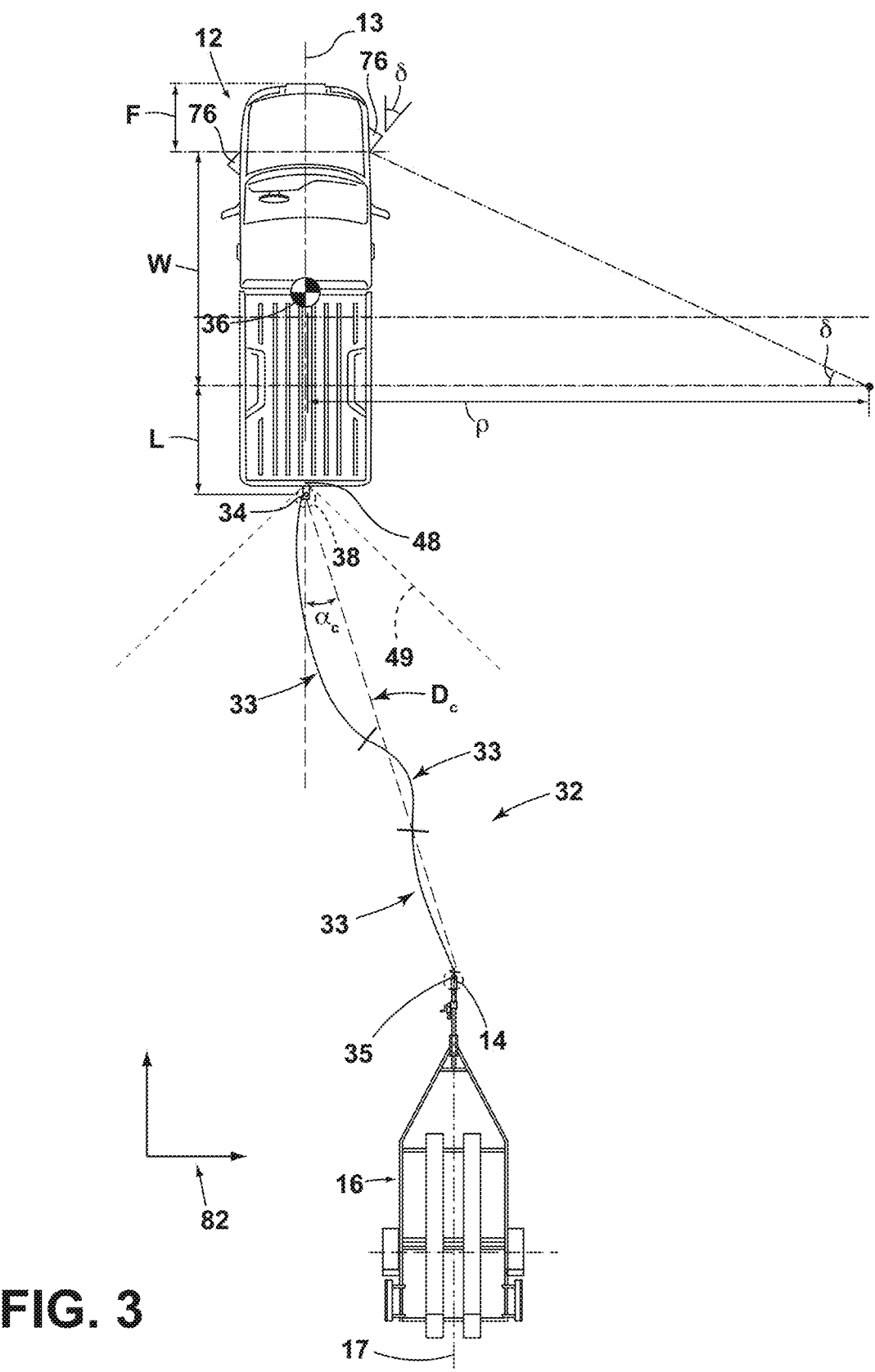
FIG. 3 is an overhead schematic view of a vehicle during a step of the alignment sequence with the trailer.

With continued reference to FIG. 2, the power assist steering system 20 provides the controller 26 of the hitch assist system 10 with information relating to a rotational position of steered wheels 76 of the vehicle 12, including a steering angle δ. The controller 26 in the illustrated embodiment processes the current steering angle, in addition to other vehicle 12 conditions to guide the vehicle 12 along the desired path 32 (FIG. 3). It is conceivable that the hitch assist system 10, in additional embodiments, may be an integrated component of the power assist steering system 20. For example, the power assist steering system 20 may include a hitch assist algorithm for generating vehicle steering information and commands as a function of all or a portion of information received from the imaging system 18, the power assist steering system 20, a vehicle brake control system 70, a powertrain control system 72, and other vehicle sensors and devices, as well as a human-machine interface 40, as discussed further below.

As also illustrated in FIG. 2, the vehicle brake control system 70 may also communicate with the controller 26 to provide the hitch assist system 10 with braking information, such as vehicle wheel speed, and to receive braking commands from the controller 26. For instance, vehicle speed information can be determined from individual wheel speeds as monitored by the brake control system 70. Vehicle speed may also be determined from the powertrain control system 72, the speed sensor 56, and the positioning system 22, among other conceivable means. In some embodiments, individual wheel speeds can also be used to determine a vehicle yaw rate $\dot{\delta}$, which can be provided to the hitch assist system 10 in the alternative or in addition to the vehicle yaw rate sensor 58. The hitch assist system 10 can, further, provide vehicle braking information to the brake control system 70 for allowing the hitch assist system 10 to control braking of the vehicle 12 during backing of the trailer 16. For example, the hitch assist system 10, in some embodiments, may regulate speed of the vehicle 12 during alignment of the vehicle 12 with the coupler 14 of trailer 16, which can reduce the potential for contact with trailer 16, and can bring vehicle 12 to a complete stop at a determined endpoint 35 of path 32. The powertrain control system 72, as shown in the embodiment illustrated in FIG. 2, may also interact with the hitch assist system 10 for regulating speed and acceleration of the vehicle 12 during partial or autonomous alignment with trailer 16. As mentioned above, regulation of the speed of the vehicle 12 may be advantageous to properly align vehicle 14 with trailer 16.

Additionally, the hitch assist system 10 may communicate with human-machine interface ("HMI") 40 for the vehicle 12. The HMI 40 may include a vehicle display 44, such as a center-stack mounted navigation or entertainment display (FIG. 1). HMI 40 further includes an input device, which can be implemented by configuring display 44 as a portion of a touchscreen 42 with circuitry 46 to receive an input corresponding with a location over display 44. Other forms of input, including one or more joysticks, digital input pads, or the like can be used in place or in addition to touchscreen 42. Further, the hitch assist system 10 may communicate via wireless communication with another embodiment of the HMI 40, such as with one or more handheld or portable devices 96 (FIG. 1), including one or more smartphones. The portable device 96 may also include the display 44 for displaying one or more images and other information to a user. For instance, the portable device 96 may display one or more images of the trailer 16 on the display 44 and may be further able to receive remote user inputs via touchscreen circuitry 46. In addition, the portable device 96 may provide feedback information, such as visual, audible, and tactile alerts.

Still referring to the embodiment shown in FIG. 2, the controller 26 is configured with a microprocessor 60 to process logic and routines stored in memory 62 that receive information from the above-described sensors and vehicle systems, including the imaging system 18, the power assist steering system 20, the vehicle brake control system 70, the powertrain control system 72, and other vehicle sensors and devices. The controller 26 may generate vehicle steering information and commands as a function of all or a portion of the information received. Thereafter, the vehicle steering information and commands may be provided to the power assist steering system 20 for affecting steering of the vehicle 12 to achieve a commanded path 32 (FIG. 3) of travel for alignment with the coupler 14 of trailer 16. The controller 26 may include the microprocessor 60 and/or other analog and/or digital circuitry for processing one or more routines. Also, the controller 26 may include the memory 62 for storing one or more routines, including an image processing routine 64 and/or hitch detection routine, a path derivation routine 66, and an operating routine 68. It should be appreciated that the controller 26 may be a stand-alone dedicated controller or may be a shared controller integrated with other control functions, such as integrated with a vehicle sensor system, the power assist steering system 20, and other conceivable onboard or off-board vehicle control systems. It should further be appreciated that the image processing routine 64 may be carried out by a dedicated processor, for example, within a stand-alone imaging system for vehicle 12 that can output the results of its image processing to other components and systems of vehicle 12, including microprocessor 60. Further, any system, computer, processor, or the like that completes image processing functionality, such as that described herein, may be referred to herein as an "image processor" regardless of other functionality it may also implement (including simultaneously with executing image processing routine 64).

System 10 can also incorporate an imaging system 18 that includes one or more exterior cameras, which in the illustrated examples include rear camera 48, center high-mount stop light (CMHSL) camera 50, and side-view cameras 52a and 52b, although other arrangements including additional or alternative cameras are possible. In one example, imaging system 18 can include rear camera 48 alone or can be configured such that system 10 utilizes only rear camera 48 in a vehicle with multiple exterior cameras. In another example, the various cameras 48, 50, 52a, 52b included in imaging system 18 can be positioned to generally overlap in their respective fields of view, which may correspond with rear camera 48, center high-mount stop light (CMHSL) camera 50, and side-view cameras 52a and 52b, respectively. In this manner, image data 55 from two or more of the cameras can be combined in image processing routine 64, or in another dedicated image processor within imaging system 18, into a single image. In an extension of such an example, the image data 55 can be used to derive stereoscopic image data that can be used to reconstruct a three-dimensional scene of the area or areas within overlapped areas of the various fields of view 49, 51, 53a, 53b, including any objects (obstacles or coupler 14, for example) therein. In an embodiment, the use of two images including the same object can be used to determine a location of the object relative to the two image sources, given a known spatial relationship between the image sources. In this respect, the image processing routine 64 can use known programming and/or functionality to identify an object within image data 55 from the various cameras 48, 50, 52a, and 52b within imaging system 18. In either example, the image processing routine 64 can include information related to the positioning of any cameras 48, 50, 52a, and 52b present on vehicle 12 or utilized by system 10, including relative to the center 36 (FIG. 1) of vehicle 12, for example such that the positions of cameras 48, 50, 52a, and 52b relative to center 36 and/or to each other can be used for object positioning calculations and to result in object position data relative to the center 36 of vehicle 12, for example, or other features of vehicle 12, such as hitch ball 34 (FIG. 1), with known positions relative to center 36.

The image processing routine 64 can be specifically programmed or otherwise configured to locate coupler 14 within image data 55. In an example, the image processing routine 64 can first attempt to identify any trailers 16 within the image data 55, which can be done based on stored or otherwise known visual characteristics of trailer 16, of an number of different types, sizes or configurations of trailers compatible with system 10, or trailers in general. Controller 26 can seek confirmation from the user that the identification of the trailer 16 is accurate and is the correct trailer for which to complete an automated hitching operation, as described further below. After the trailer 16 is identified, controller 26 may then identify the coupler 14 of that trailer 16 within the image data 55 based, similarly, on stored or otherwise known visual characteristics of coupler 14 or couplers in general. In another embodiment, a marker in the form of a sticker or the like may be affixed with trailer 16 in a specified position relative to coupler 14 in a manner similar to that which is described in commonly-assigned U.S. Pat. No. 9,102,271, the entire disclosure of which is incorporated by reference herein. In such an embodiment, image processing routine 64 may be programmed with identifying characteristics of the marker for location in image data 55, as well as the positioning of coupler 14 relative to such a marker so that the location 28 of coupler 14 can be determined based on the marker location. Additionally or alternatively, controller 26 may seek confirmation of the determined coupler 14, via a prompt on touchscreen 42. If the coupler 14 determination is not confirmed, further image processing may be provided, or user-adjustment of the position 28 of coupler 14 may be facilitated, either using touchscreen 42 or another input to allow the user to move the depicted position 28 of coupler 14 on touchscreen 42, which controller 26 uses to adjust the determination of position 28 of coupler 14 with respect to vehicle 12 based on the above-described use of image data 55.

In various examples, controller 26 may initially rely on the identification of trailer 16 for the initial stages of an automated hitching operation, with the path 32 being derived to move the hitch ball 34 toward a centrally-aligned position with respect to trailer 16 with the path 32 being refined once the coupler 14 is identified. Such an operational scheme can be implemented when it is determined that trailer 16 is at a far enough distance from vehicle 12 to begin backing without knowing the precise endpoint 35 of path 32 and can be useful when trailer 16 is at a distance where the resolution of the image data 55 makes it possible to accurately identify trailer 16, but at which the coupler 14 cannot be precisely identified. In this manner, initial rearward movement of vehicle 12 can allow for calibration of various system 10 inputs or measurements that can improve the accuracy of distance measurements, for example, that can help make coupler 14 identification more accurate. Similarly, movement of vehicle 12 resulting in a change to the particular image within the data 55 that can improve the resolution or move the coupler 14 relative to the remaining portions of trailer 16 such that it can be more easily identified.

As shown in FIG. 3, the image processing routine 64 and operating routine 68 may be used in conjunction with each other to determine the path 32 along which hitch assist system 10 can guide vehicle 12 to align hitch ball 34 and coupler 14 of trailer 16. Upon initiation of hitch assist system 10, such as by user input on touchscreen 42, for example, image processing routine 64 can identify coupler 14 within the image data 55 and at least attempt to estimate the position 28 of coupler 14 relative to hitch ball 34 using the image data 55 in accordance with one of the examples discussed above to determine a distance $D_c$ to coupler 14 and an angle ct, of offset between a line connecting hitch ball 34 and coupler 14 and the longitudinal axis of vehicle 12. Image processing routine 64 can also be configured to identify the trailer 16 overall and can use the image data of trailer 16, alone or in combination with the image data of coupler 14, to determine the orientation or heading 33 of trailer 16. In this manner the path 32 can further be derived to align vehicle 12 with respect to trailer 16 with the longitudinal axis 13 of vehicle 12 within a predetermined angular range of the heading 33 of trailer 16. Notably, such alignment may not require that the longitudinal axis 13 of vehicle 12 is parallel or collinear with the heading 33 of trailer 16, but may simply be within a range that generally allows connection of hitch ball 34 with coupler 14 without resulting in contact between vehicle 12 and trailer 16 and may, further allow immediate controlled backing of trailer 16 using vehicle 12. In this manner, the angular range may be such that the alignment of vehicle 12 with trailer 16 at the end of the operating routine 68 is such that the angle between longitudinal axis 13 and heading 33 is less than the jackknife angle between the vehicle 12 and trailer 16 when coupled or a reasonable estimate thereof. In one example, the angular range may be such that longitudinal axis 13 is within about 30° from collinear with heading 33 in either direction.

Continuing with reference to FIG. 3 with additional reference to FIG. 2, controller 26, having estimated the positioning $D_c$, $\alpha_c$ of coupler 14, as discussed above, can, in one example, execute path derivation routine 66 to determine vehicle path 32 to align the vehicle hitch ball 34 with coupler 14. In particular, controller 26 can have stored in memory 62 various characteristics of vehicle 12, including the wheelbase W, the distance from the rear axle to the hitch ball 34, which is referred to herein as L, as well as the maximum angle to which the steered wheels 76 can be turned $\delta_{max}$. As shown, the wheelbase W and the current steering angle δ can be used to determine a corresponding turning radius ρ for vehicle 12 according to the equation:

$$\rho = \frac{W}{\tan \delta}, \quad (1)$$

in which the wheelbase W is fixed and the steering angle δ can be controlled by controller 26 by communication with steering system 20, as discussed above. In this manner, when the maximum steering angle $\delta_{max}$ is known, the smallest possible value for the turning radius $\rho_{min}$ is determined as:

$$\rho_{min} = \frac{W}{\tan \delta_{max}}. \quad (2)$$

Path derivation routine 66 can be programmed to derive vehicle path 32 to align a known location of the vehicle hitch ball 34 with the estimated position 28 of coupler 14 that takes into account the determined minimum turning radius $\rho_{min}$ to allow path 32 to use the minimum amount of space and maneuvers. In this manner, path derivation routine 66 can use the position of vehicle 12, which can be based on the center 36 of vehicle 12, a location along the rear axle, the location of the dead reckoning device 24, or another known location on the coordinate system 82, to determine both a lateral distance to the coupler 14 and a forward or rearward distance to coupler 14 and derive a path 32 that achieves the needed lateral and forward-backward movement of vehicle 12 within the limitations of steering system 20. The derivation of path 32 further takes into account the positioning of hitch ball 34, based on length L, relative to the tracked location of vehicle 12 (which may correspond with the center 36 of mass of vehicle 12, the location of a GPS receiver, or another specified, known area) to determine the needed positioning of vehicle 12 to align hitch ball 34 with coupler 14. It is noted that hitch assist system 10 can compensate for horizontal movement Δx of coupler 14 in a driving direction away from axle 84 by determining the movement of coupler 14 in the vertical direction Δy that will be needed to receive hitch ball 34 within coupler 14. Such functionality is discussed further in commonly-assigned U.S. Pat. No. 9,821,845 and co-pending application Ser. No. 16/038,462, now U.S. Pat. No. 10,870,323, the entire disclosures of which are hereby incorporated by reference herein.

As discussed above, once the desired path 32, including endpoint 35, has been determined, controller 26 is then allowed to at least control the steering system 20 of vehicle 12 with the powertrain control system 72 and the brake control system 70 (whether controlled by the driver or by controller 26, as discussed below) controlling the velocity (forward or rearward) of vehicle 12. In this manner, controller 26 can receive data regarding the position of vehicle 12 during movement thereof from positioning system 22 while controlling steering system 20, as needed to maintain vehicle 12 along path 32. In particular, the path 32, having been determined based on the vehicle 12 and the geometry of steering system 20, can adjust the steering angle δ, as dictated by path 32, depending on the position of vehicle 12 therealong. It is additionally noted that in an embodiment, the path 32 may comprise a progression of steering angle δ adjustment that is dependent on the tracked vehicle position.

As illustrated in FIG. 3, vehicle path 32 can be determined to achieve the needed lateral and rearward movement within the smallest area possible and/or with the lowest number of maneuvers. In the illustrated example of FIG. 3, path 32 can include two portions defined by steering of wheels 76 in different directions to collectively traverse the needed lateral movement of vehicle 12, while providing final straight, rearward backing segment to bring hitch ball 34 into the above-described offset alignment with coupler 14. It is noted that variations in the depicted path 32 may be used. It is further noted that the estimates for the positioning $D_c$, $\alpha_c$ of coupler 14 may become more accurate as vehicle 12 traverses path 32, including to position vehicle 12 in front of trailer 16 and as vehicle 12 approaches coupler 14. Accordingly, such estimates can be continuously derived and used to update path derivation routine 66, if necessary, in the determination of the adjusted endpoint 35 for path 32, as discussed above. In a similar manner, the path 32, as derived using the position and orientation data acquired from a portable device 96, such a smartphone, can be fine-tuned once the image processing routine 64 can identify coupler 14 in the image data 55, with continued updates for path 32 being similarly derived as the image data 55 becomes increasingly clear during the approach toward trailer 16. It is further noted that, until such a determination can be made, the dead reckoning device 24 can be used to track the location of vehicle 12 in its movement along path 32 toward the initially-derived endpoint 35.

In this manner, the initial determination of the position 28 of trailer 16 to an accepted level of accuracy is needed for execution of the path derivation routine 66 and subsequent automated backing of vehicle 12 along the path 32. Various characteristics or limitations of system 10 may impact the ability of system 10 to identify the trailer 16 (as well as the coupler 14, whenever such identification is carried out) in the data 55 received from imaging system 18 under certain conditions or in certain settings. Still further, various vehicle 12 or other system 10 characteristics may impact the ability of system 10 to navigate to reach a trailer 16 that is, nevertheless, present within the image data 55. Depending on the particular configuration of system 10, such characteristics can be partially driven by the imaging system 18 used by system 10. The imaging system 18 may be limited in its ability to identify a trailer 16 and/or coupler 14 within the entire field of the image data 55. For example, as illustrated in FIG. 4, the resolution of the various cameras 48,50,52a,52b in imaging system 18 may impact the ability to identify any trailers 16 or couplers 14 beyond a maximum distance R1 from vehicle 12 with the particular value of R1 being influenced by ambient conditions, including available light and/or weather conditions (e.g., rain or snow).

Figure 4:
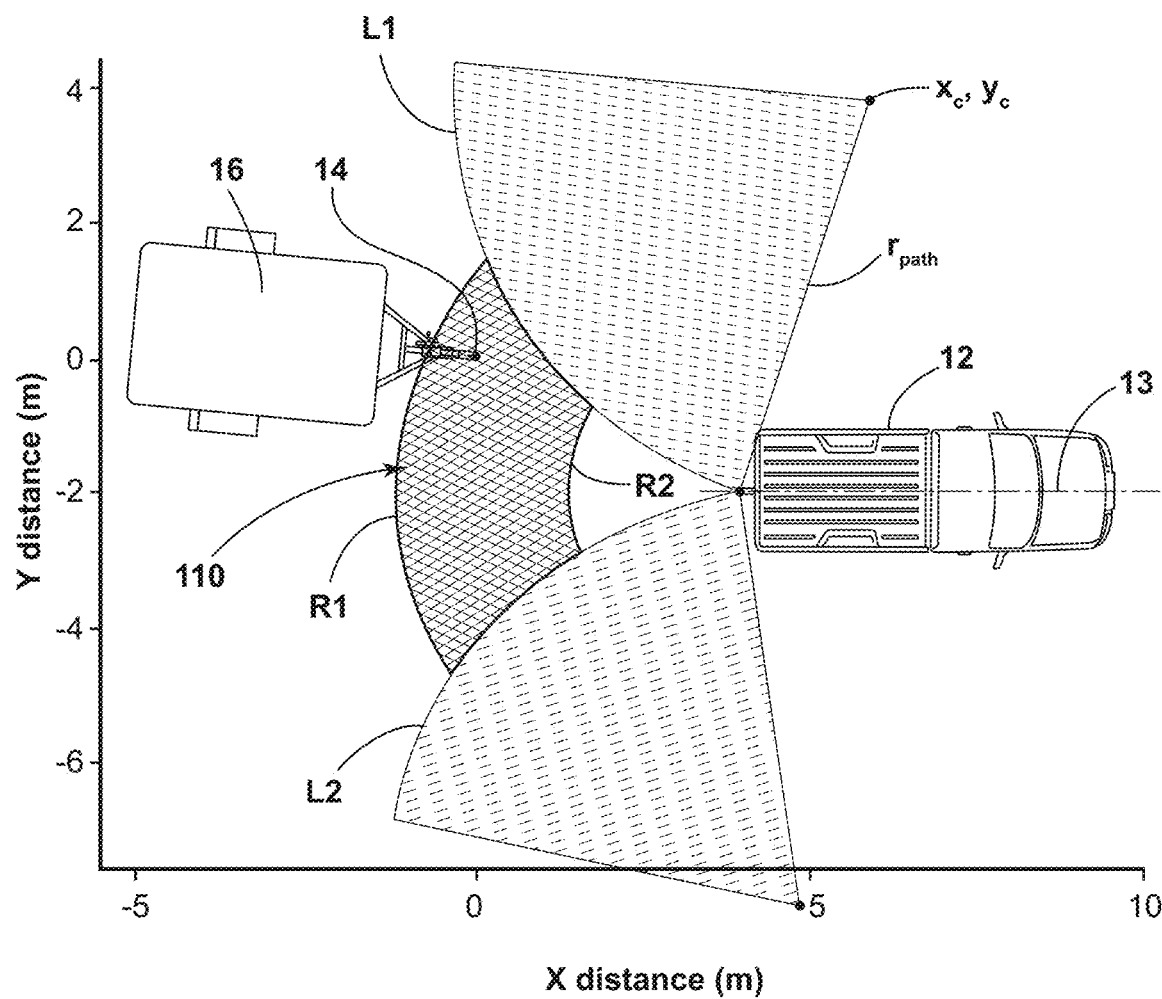
FIG. 4 is a schematic depiction of an acceptable zone for reaching a trailer based on an initial alignment with a vehicle including a system according to FIG. 2.

Additionally, a minimum distance R1, also illustrated in FIG. 4, for trailer 16 or coupler 14 detection may be realized because certain implementations of system 10 may rely on dynamic readings (such as of the ground surface behind vehicle 12 or other features visible around coupler 14) to calibrate system 10 and or to track vehicle 12 speed in reversing and to track the position of coupler 14 during system 10 operation. In particular, in the above example where only rear camera 48 is used by system 10, it may be necessary to detect motion within the field of view 49 to identify distance to the coupler 14 and to provide accurate tracking and boundary resolution (an aspect of image processing routine 64). Further, the operating routine 68 may include a longitudinal control algorithm that relies on precise control of the vehicle 12, and a minimum amount of travel distance corresponding with R2 in an example, is required to calibrate certain braking and powertrain variables to achieve such vehicle control. Still further, if a trailer 16 is too close to vehicle 12, various features of the trailer 16 may appear as trailers themselves to the image processing routine 64, meaning that to assist system 10, the trailer 16 should be beyond the minimum distance R1 such that a proportionality of features, including of trailer 16 itself as well as of trailer 16 relative to the total field of image data 55, is optimized for image processing routine 64 functionality.

As also shown in FIG. 4, other limitations of system 10 functionality may also constrain system operation. In this respect, system 10 may not be capable of maneuvering vehicle 12 towards all locations to the rear of vehicle or otherwise in an initial view of the rear camera 48 (and, thus in an area where a coupler 14 may be identifiable by controller 26). In particular, system 10 may be restricted in its ability to reach a potential target position due, but not limited, to a lateral span that is a function of a distance range and the steering angle δ limitations of vehicle 12. In a variation of system 10 that is limited to execution of the operating routine 68, as described herein, within a single reversing operation (i.e., wherein system 10 does not have the ability, permission, or other configuration to change the direction of travel for vehicle by manipulation of gear selector 94), the system 10 can, accordingly, only navigate hitch ball 34 to align with a coupler 14 within a valid zone 110 reachable by vehicle 12 in a single reversing maneuver. In one aspect, the maximum steering angle $\delta_{max}$ of the vehicle 12 determines the lateral range of navigation and, thusly, the valid zone 110, as a function of distance $D_c$ to coupler 14, as discussed further below. In general, an implementation of system 10 may restrict maneuvering of vehicle 12 to a single reversing motion that, while potentially including steering in both the left and right directions, does not incorporate forward driving of vehicle 12 between successive instances of reverse driving, for example. In this manner, the maximum lateral distance that can be traversed by vehicle 12 in an automated hitching operation is limited by the maximum steering angle $\delta_{max}$. As the vehicle 12 travels laterally by turning the steered wheels 76 and reversing, the lateral vehicle steering limits L1,L2 of system 10 operability are determined as, essentially, a theoretical hitch ball 34 path extending rearward of the vehicle corresponding with steering of vehicle 12 at a particular steering angle δ under reversing of vehicle 12 to either side. In this manner, the lateral vehicle steering limits L1,L2 of system 10 may extend outwardly from vehicle 12, with increasing distance away from vehicle 12 and may be characterized or determined based on left and right steering path limits of vehicle 12.

Figure 5:
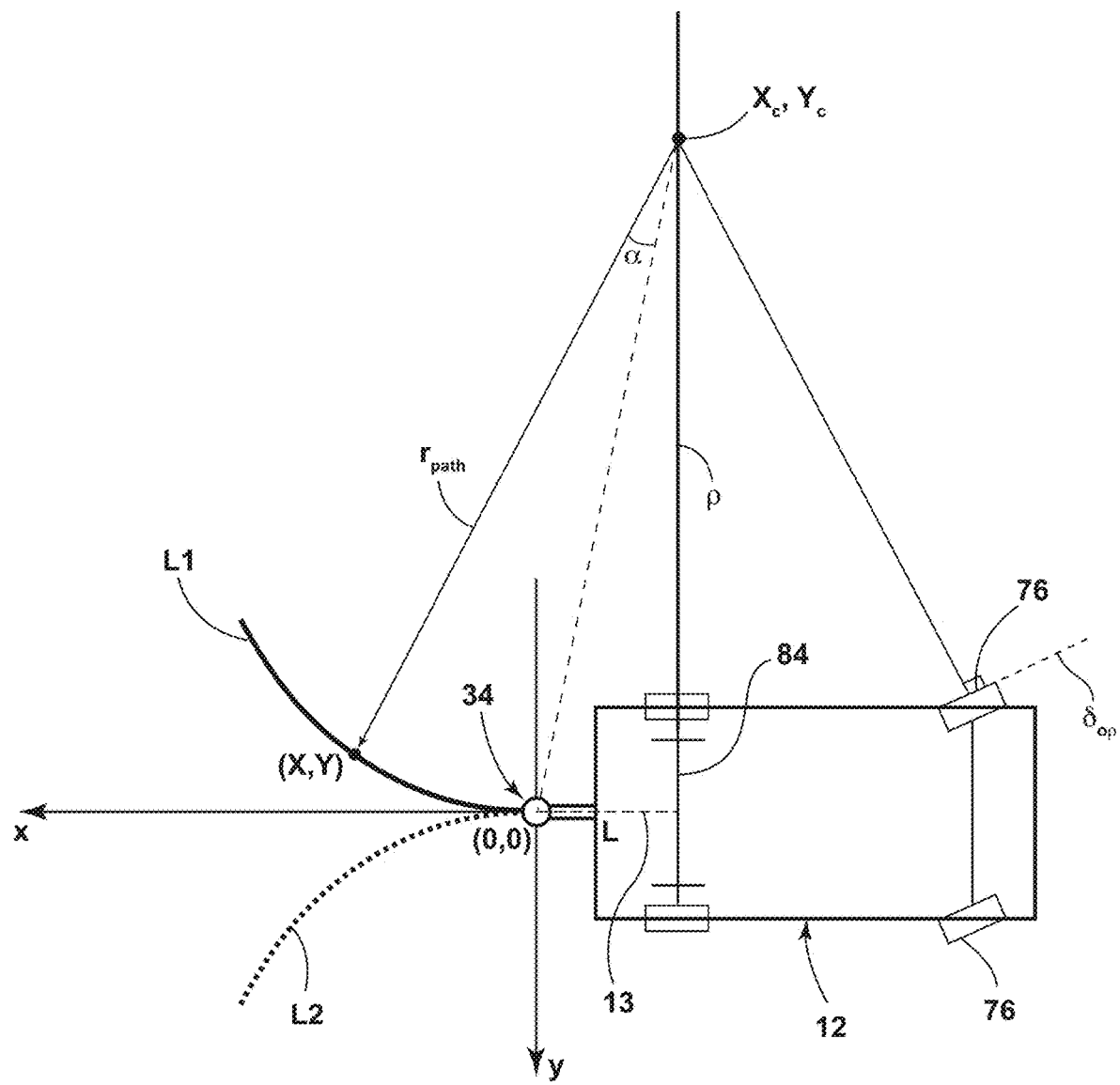
FIG. 5 is an overhead schematic view depicting the geometry for determining lateral limits of the acceptable zone.

As shown in FIGS. 4 and 5, the lateral limits L1, L2 can extend rearward from hitch ball 34 along arced paths based on the steering characteristics of vehicle 12, including the steering limit $\delta_{max}$ of steering system 20 and other limitations or performance parameters. In particular, the performance of system 10 in controlling vehicle 12 and/or providing a generally-acceptable path 32 may be improved, as discussed above, by configuring path derivation routine 66 to maintain the steering angle δ below the maximum $\delta_{max}$ by a predetermined amount or at the otherwise established operating angle $\delta_{op}$ (discussed below). In one example, the operating angle $\delta_{op}$ may be less than the maximum steering angle $\delta_{max}$ by a preset or adjustable offset, which may be a set angle (e.g., about 3° to about 10°) or by a preset or adjustable percentage based proportion (e.g., about 5% to about 25%). In other examples, discussed above, the operating angle $\delta_{op}$ may be based on specific characteristics of vehicle 12 based on other set or adjustable parameters. As shown in FIG. 5, the projected steering limits L1,L2 can each be a single arc-shaped segment extending from the hitch ball 34 in a direction toward the coupler 14. In one aspect, the theoretical radius $r_{path}$ of the arc-shaped segment can be determined as follows:

$$r_{path} = \sqrt{\rho^2 + L^2}, \quad (3)$$

where:

ρ is the radius from the longitudinal axis 13 of vehicle 12 extending collinear with the rear axle 84 of vehicle 12 and is defined by the Equation (1), above where $\delta = \delta_{max}$; and L represents the distance between the center of the rear axle and the hitch ball 34, coordinate (0,0).

In this manner, the arced path of the lateral limits L1,L2 may be mirror images of each other about the longitudinal axis 13 of vehicle 12 and may be defined by the following equations, where x and y are the coordinates of any points on lateral limit L1:

$$x = -x_c \cos(-\alpha) + y_c \sin(-\alpha) + x_c \quad (4)$$

$$y = -x_c \sin(-\alpha) - y_c \cos(-\alpha) + y_c, \quad (5)$$

where:
  $x_c, y_c$ is a coordinate representing the turn center for a given maximum steering angle $\delta_{max}$; and
  α represents the angle extending from the hitch ball to an upper limit that can be set to define the arced paths of L1 and L2 to extend to a distance beyond R1, for example.

The turn center for a left turn can be described as $x_c=-L$ and $y_c=-\rho$ and can be described as $x_c=L$ and $y_c=\rho$ for a right turn. From the maximum steering angle $\delta_{max}$ or determined operating angle $\delta_{op}$, system 10 can determine the turn center and can use the above equations to determine the steering limits L1,L2 within a frame of reference centered at hitch ball 34 and its x-axis aligned with the longitudinal axis 13 of vehicle 12. Notably, the length L, as well as the wheelbase W, which affect the positioning of the turn center for the determined steering angle are stored in memory 62 for the particular vehicle 12 and the particular hitch ball 34 being used. As shown in FIG. 4, a "valid" zone 110 can, thusly, be defined as the area laterally between the limits L1 and L2.

Because of these limitations, the present system 10 may be configured to only function with trailers 16 and associated couplers 14 positioned inside the valid zone 110 relative to the vehicle 12, as shown in FIG. 4. In one aspect, the valid zone 110 can serve as a baseline reference for a required alignment of vehicle 12 with respect to trailer 16 for a hitching operation. In this respect, a target area 112 may be defined within the valid zone 110 and used by system 10 in further limiting the possible positions of vehicle 12 with respect to trailer 16 and/or coupler 14 for execution of a hitching operation. In one aspect, the additional limitations for target area 112 within the valid zone 110 may be determined using a perception factor related to the above-described limiting factors of the image processing and coupler detection routine 64, and, potentially, any additional factors that affect the system 10 capability. As discussed above, the limitations of camera 48 and the requirements of image processing routine 64 and operating routine 68 can establish the maximum distance R1 and the minimum distance R2 from the rear of vehicle 12 for coupler 14 identification, which can establish the bounds of the target area 112 with general respect to the longitudinal axis 13 of vehicle 12. In the illustrated example, the maximum distance R1 and the minimum distance R2 can be measured from the hitch ball 34 (or alternatively the rear camera 48, which may be positioned adjacent hitch ball 34, albeit at a different height) at a consistent distance therefrom such that R1 and R2 are radially spaced about the hitch ball 34 (or rear camera 48). In an example, it may be assumed, at least for simplicity of illustration, that system 10 uses rear camera 48 only for trailer 16 and coupler 14 detection, with rear camera 48 having a field of view 49 that is included in its entirety in the "total field" of the image data 55 (notably, if additional cameras 50,52a,52b are used, the total field of the image data 55 would include the entire assembled image from all such utilized cameras). The imaging system 18 limitations may limit system 10 functionality to only a limited distance between trailer coupler 14 and the vehicle 12, as different factors may limit the ability of controller 26 in identifying a trailer 16 or its coupler 14 when the trailer 16 and vehicle 12 are too close together or too far apart, as discussed above.

Figure 6:
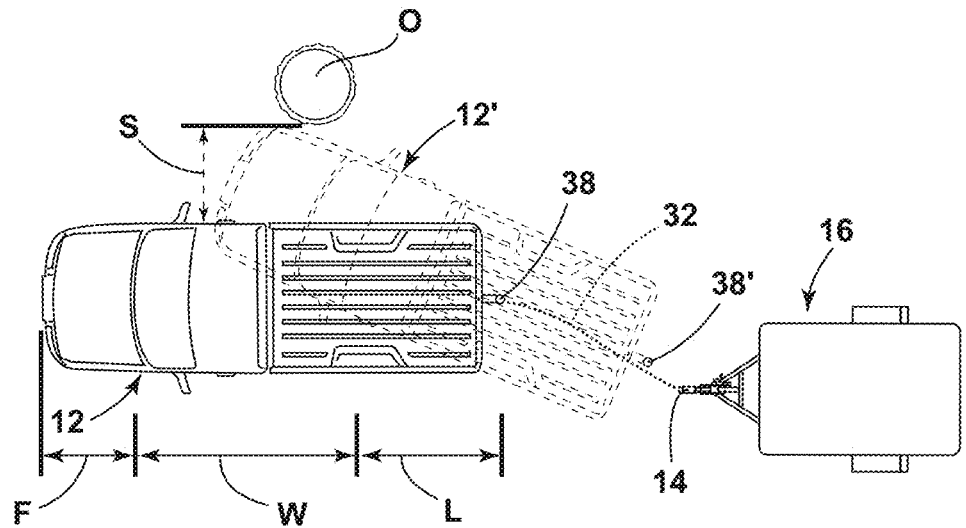
FIG. 6 is an overhead schematic view showing an example of vehicle front-end swingout during a backing maneuver.
Figure 7:
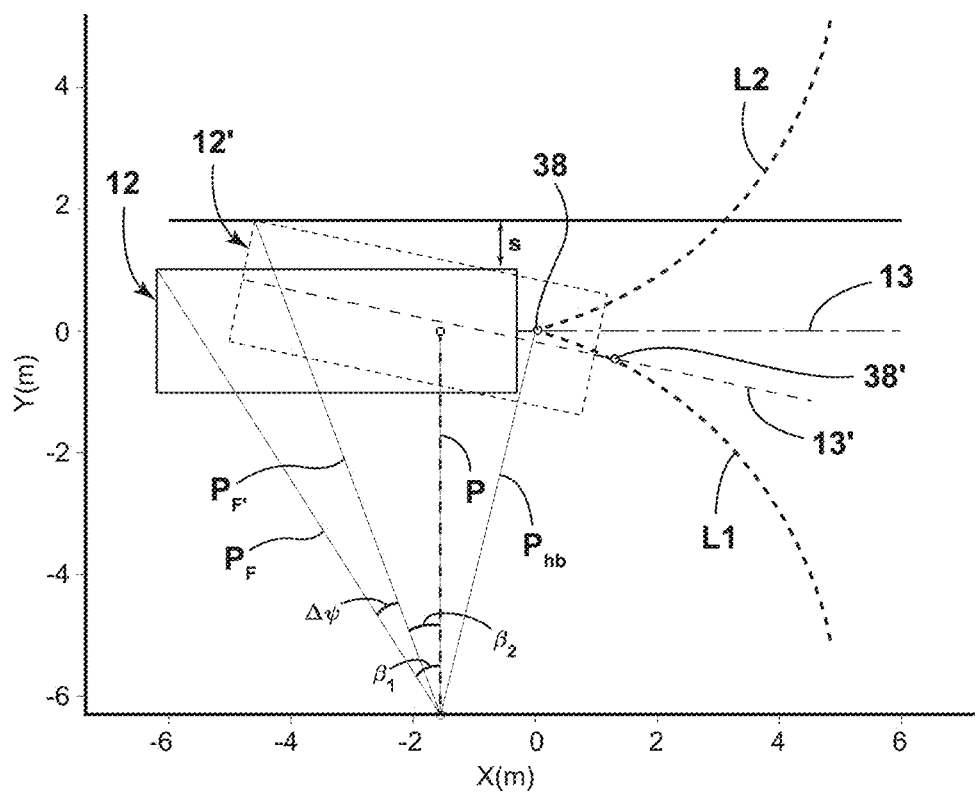
FIG. 7 is a diagram showing the geometry of the vehicle affecting swingout and illustrating an axis resulting from a change in vehicle rotation at a swingout limit.

In a further aspect illustrated in FIGS. 6 and 7, the target area 112 can be reduced laterally from the steering limits L1,L2 of vehicle 12 according to one or more factors related to vehicle 12 geometry. For example, the target area 112 can be limited to reduce front end swingout S of vehicle 12 during reversing toward trailer 16, as the amount of swingout is related to vehicle geometry. As shown in FIG. 7, the positioning of the steering center $x_c, y_c$ relative to vehicle 12 can be such that the front end of vehicle 12 moves laterally outward in a direction away from the subject coupler 14 when vehicle 12 begins navigating toward trailer 16. Referring to the schematic vehicle model of FIG. 8, lateral boundaries B1,B2 of target area 112 can be determined to limit the swing out distance S allowed for the particular vehicle 12. Beginning with the initial assumption that the vehicle 12 executing operating routine 68 begins a backing maneuver using the maximum steering wheel angle $\delta_{max}$, the position of vehicle 12 can be determined at a point where a predetermined swing out limit S has been reached. This position can be found for a lateral swing out limit S beginning with the equation:

$$R_{OF} = \sqrt{\left(R + \frac{V}{2}\right)^2 + (W+F)^2}, \quad (6)$$

where:
  $R_{OF}$ is the turn radius of the outside front corner of the vehicle;
  V is the vehicle width;
  F is the longitudinal distance from the front axle to the front corner of the vehicle; and
  W is the wheelbase of vehicle 12.

Subsequently, the angle flu between the steering radius R and the front outside corner of vehicle 12 in the initial position can be determined using the equation:

$$\beta_1 = \tan^{-1} \frac{F*W}{R + \frac{W}{2}}. \quad (7)$$

In a similar manner, the angle $\beta_2$ between the steering radius R and the front outside corner of vehicle 12' having laterally traversed by the swing out limit S can be determined using the equation:

$$\beta_2 = \cos^{-1} \frac{R + \frac{VW}{2} + s}{R_{OF}}. \quad (8)$$

Accordingly, the change in heading angle dip of the vehicle 12 from the initial position to the position 12' in which the front outside corner of vehicle 12' has laterally traversed by the swing out limit S is determined by the equation:

$$\Delta\psi = \beta_1 - \beta_2. \quad (9)$$

Knowing the change in heading angle $\Delta\psi$ of the vehicle 12 from the initial position to the position 12' in which the front outside corner of vehicle 12' has laterally traversed by the swing out limit S, the longitudinal axis 13' of vehicle 12' in such a position is known as being translated at the same angle about the turning center $x_c, y_c$ of vehicle 12. As shown in FIG. 9, the projected longitudinal axis 13', thusly determined, can be used as the corresponding lateral boundary B1 of the target area 112. Accordingly, the opposite lateral boundary B2 of target area 112 is a mirror image of boundary B1 about the original longitudinal axis 13 of vehicle 12. As further shown in FIG. 8, the resulting positioning and configuration of target area 112' within the vehicle steering limits L1,L2 is shown. In the depicted example, the projected vehicle axes 13', derived using equations 6-9, are positioned outside of the vehicle steering limits L1,L2 in an area extending rearward from immediately adjacent vehicle 12. In this respect, the derived target area 112' is defined by the innermost of the respective limits L1,L2 or projected vehicle axes 13' such that, extending rearward from hitch ball 34, the derived target area 112' is defined by the steering limit L1,L2 projections from hitch ball 34 until the steering limit L1,L2 projections intersect with the projected vehicle axes 13', at which point the axes 13' define the respective left and right boundaries B1,B2 of target area 112'.

Figure 8:
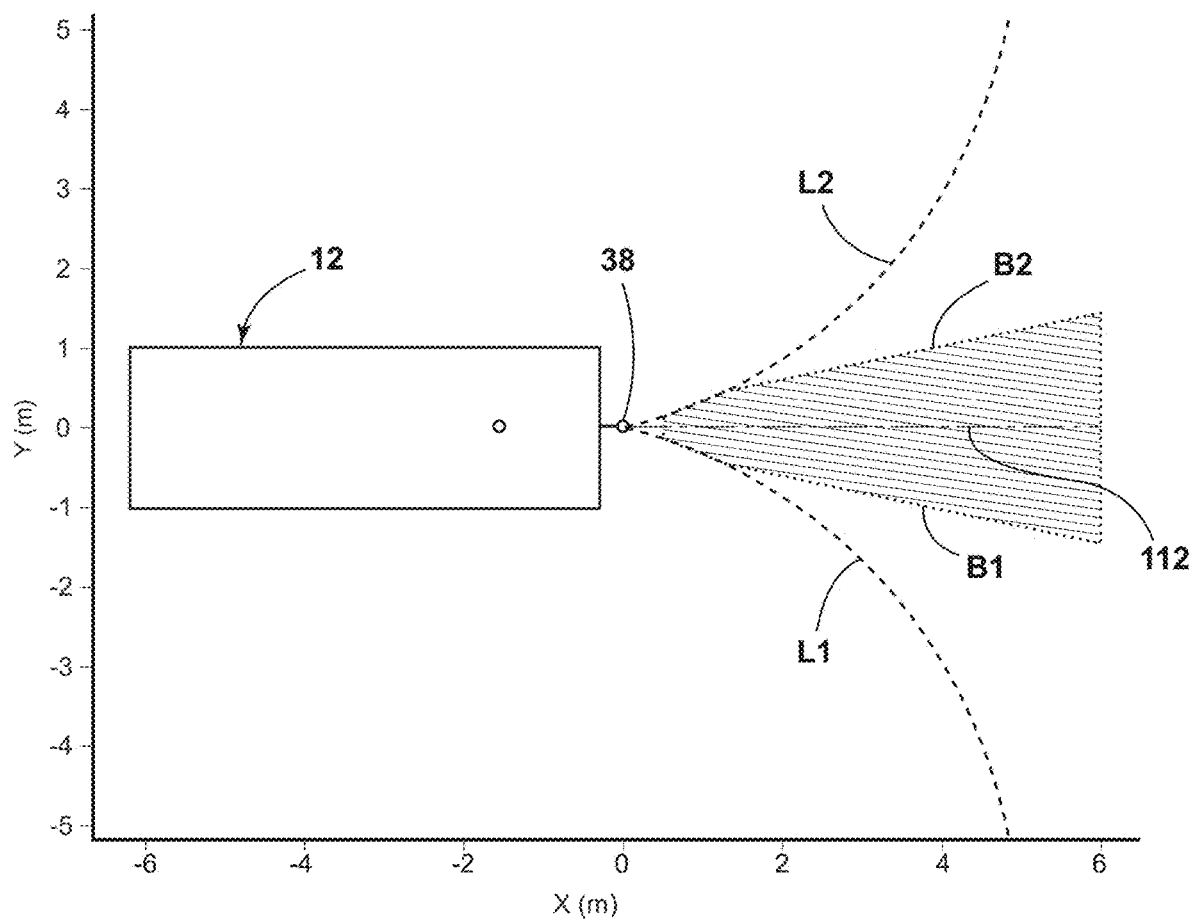
FIG. 8 is a schematic depiction of a target area for trailer alignment based on a swingout limit within a vehicle including the system according to FIG. 2.
Figure 9:
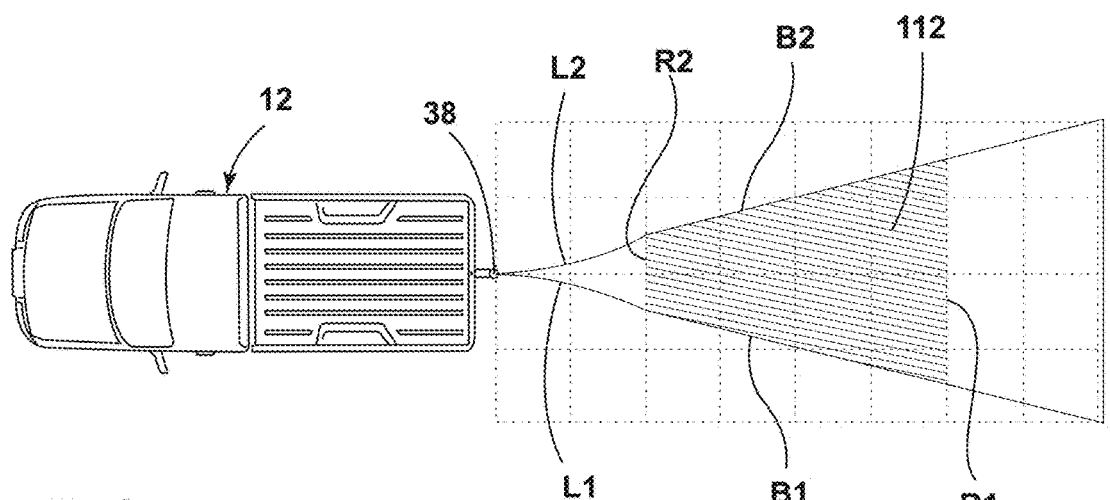
FIG. 9 is a schematic depiction of the target area of FIG. 8 further limited according to system perception factors.
Figure 10:
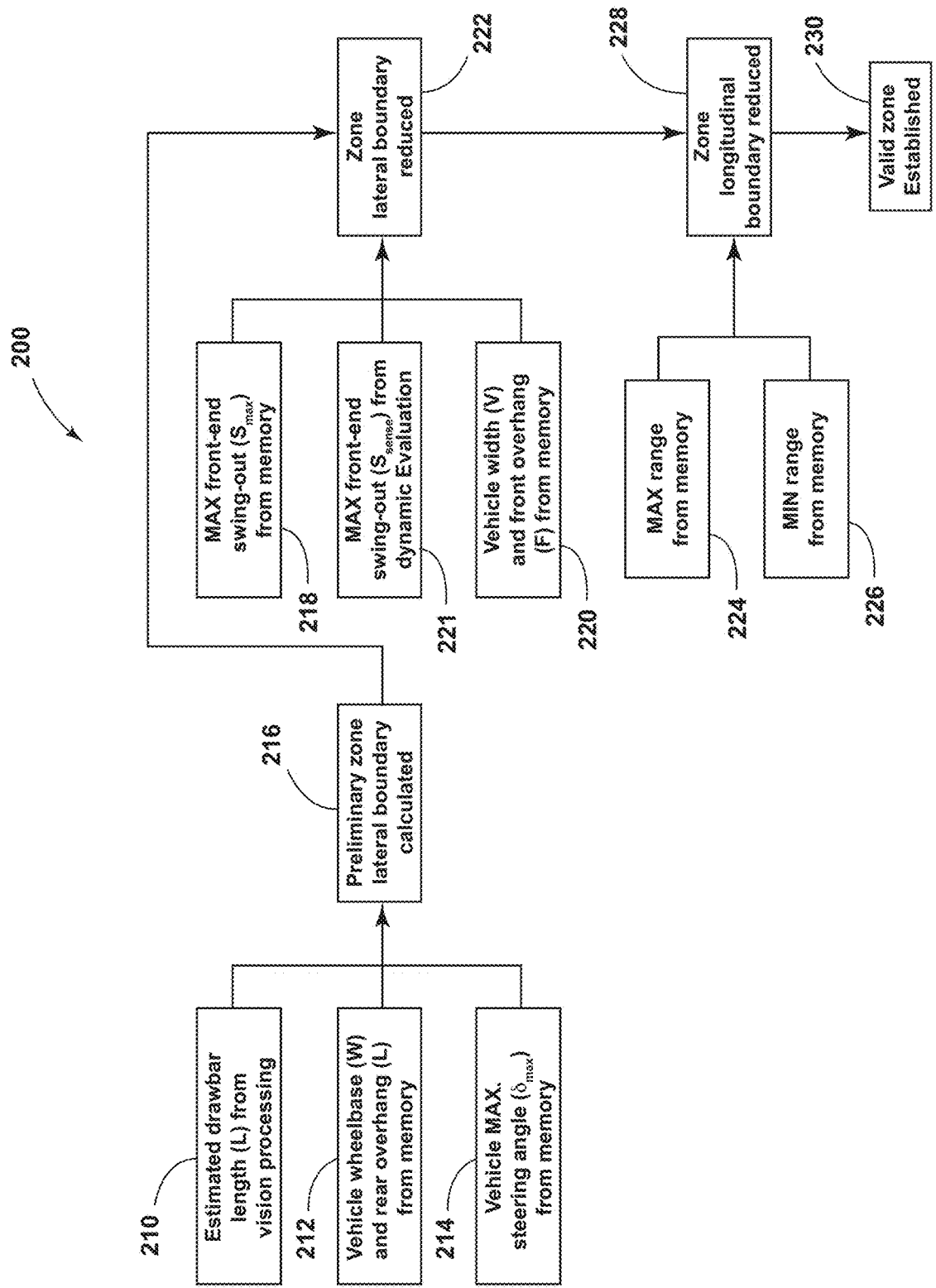
FIG. 10 is a flowchart showing a process for determining a target area according to FIG. 8.
Figure 13:
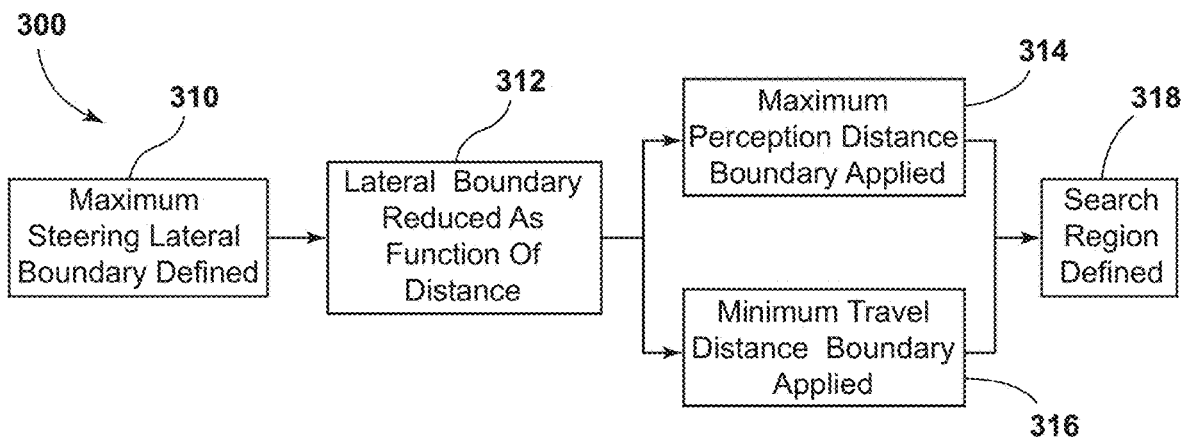
FIG. 13 is a flowchart showing steps in a process for deriving a trailer target area to account for system perception errors resulting in an unreachable trailer.

As shown in FIG. 10, application of the longitudinal restrictions of the maximum detection limit R2 and the minimum distance limit R1 to the derived target area 112' of FIGS. 8 and 9 further reduces the target area 112 within the acceptable zone 110. In the illustrated example the above described portions of the target area 112' defined by the vehicle steering limits L1,L2 are removed from the target area 112 as being closer than the minimum distance threshold R2; however, various factors may influence one or both of the positions of the projected vehicle axes 13' and the minimum distance threshold R2 such that those portions remain as a part of the target area 112. In one respect, the value used for the swing out limit S can change the positioning of lateral boundaries B1,B2 such that they may expand outward, allowing a laterally wider target area 112 and/or a longitudinally extended distance over which vehicle 12 may be reversed at a maximum steering angle $\delta_{max}$. In one example, the swing out limit S can be a fixed value stored in memory 62. Because the boundaries B1,B2 derived using the swing out limit S consider the geometry of vehicle 12, a common swing out limit S can be employed in system 10 as used in vehicles 12 of different sizes, with the relative dimensions of the particular vehicle 12 being stored in the memory 62 of that vehicle. In this respect, a generally-acceptable swing out limit S of between about 0.5 m and 1.5 m can be used. In one example, the swing out limit S can further be between about 0.5 m and 1 m can be used. In a specific example, the swing out limit S can be set at 0.75 m, with other values being possible.

With additional reference to FIG. 10, a variation of system 10 is disclosed in which the swingout limit S can be adjusted according to one or more criteria. In one example, the swing out limit S can be stored in memory accessible to a dealer or technician (e.g., without necessarily being accessible to the user) such that the swing out limit S can be adjusted to meet the expectations of the user under conditions where frequent changes are less possible, such that a consistent experience is maintained, and the effects of changes can be explained to the owner. In another variation, the swing out limit S can be adjustable, within a fixed range, by the user by accessing system 10 settings by way of the HMI 40. In such an example, the ranges for the swing out limit S can be generally within the ranges discussed above and can be set in fixed increments (e.g. 0.1 m) or the like. In such an example, the HMI 40 can present to the user an explanation or graphical depiction of the effect of the desired adjustments to the swing out limit S prior to storing the revised value in memory 62. In a further variation, vehicle 12 can include some of the sensors within proximity sensor array 54 (e.g., ultrasonic sensors, radar, etc.), or otherwise mounted on vehicle 12, such that vehicle 12 can detect an object O (for example, as shown in FIG. 7) to either side of vehicle 12 on activation of system 10. If the object O is detected within the set swing out limit S, system 10 can lower the swing out limit S further to a distance less than the lateral distance to the detected object O. As can be appreciated, lowering the swingout limit S in this manner, further restricts the target area 112 such that the driver may be coached to drive vehicle 12 to reposition vehicle 12 such that the trailer 16 can be positioned in the target area 112 without making contact with the detected object O. In this manner, system 10 can communicate the presence of object O and the resulting additional restriction of target area 112 to the driver.

Continuing with reference to FIG. 10, a method 200 for operation of system 10 according to the above description is shown. In particular, the method 200 begins on system activation by the user, at which point, system 10 uses imaging system 18 and image processing routine 64 to locate the hitch ball 38 within the image data 55, with such position being used to estimate (step 210) the drawbar length L. System 10 then retrieves from memory 62 the vehicle wheelbase W (step 212) and the maximum steering angle $\delta_{max}$ (step 214). The estimated and retrieved dimensions are then used to calculate (step 216) the acceptable zone 110 based on the vehicle steering limits L1,L2, as discussed above. Subsequently system 10 determines the target area 112 as a reduced area within the acceptable zone 110 by retrieving the set swing out limit S from memory 62 (step 218), along with the vehicle width V and front overhang F (step 220). System 10 also uses the information from sensors 54 to determine if an object O is present within the swing out limit S on either side of vehicle 12 (step 221), and uses the lower of the object distance or the set swing out limit S to determine the lateral boundaries B1,B2 of target area (step 222). System 10 then retrieves the stored maximum detectable range R2 and the minimum distance threshold R2 from memory 62 (steps 224 and 226) and uses the limits to longitudinally restrict target area 110, as discussed above. The result of the method results in the establishment 228 of a dynamically-determined target area 112 useable to align vehicle 12 with respect to a trailer 16 for execution of a hitching maneuver including a single reversing movement of vehicle 12.

Turning now to FIGS. 11A-15, in an additional or alternative example the performance or limitations of the controller 26 in the various forms contemplated herein and discussed above, may make the use of a target area 112 useful in system 10. In particular, the use of image processing routine 64 to detect a trailer 16 and identify and locate the coupler 14 thereof requires an amount of processing power that varies with the particular routine employed, the current conditions, as well as the quantity of image data 55 that must be processed. As can be appreciated, the quantity of image data 55 is influenced by a number of factors, including the image size, the image resolution, and the number of images to be analyzed (typically measured as frames-per-second ("fps")). In general, the image data 55 rate can be down-sampled relative to what is needed for a smooth video image (e.g., 30 fps to 60 fps), however, too low of an image rate can result in image data that is too "jumpy" given the expected speed of vehicle 12 during execution of image processing routine 64, for the routine 64 to make a reliable identification, as pixel tracking may be a component of the routine 64. Similarly, a higher resolution image improves the ability of image processing routine 64 to accurately locate a trailer 16 and coupler 14, particularly in non-ideal conditions, such that using lower-resolution image data may not be desirable. Still further, the camera, such as rear camera 48 (or any of the cameras 48, 50, 52a, 52b) utilized by system 10 may be used for other vehicle 12 features or functions, including as a backup camera, such that a wide field of view is otherwise desirable. In this respect, a wide field of view is helpful for the user in visually locating a desired trailer 16 for a hitching operation. At least because the entire field of view may not be reachable by vehicle 12 in a single reversing maneuver, as discussed above, it may not even be necessary for image processing routine 64 to receive the image data 55 for the entire field of view of any utilized cameras 48,50,52a,52b. In this respect, the limited size of target area 112, as discussed above may be useful in restricting the image data 55 used by routine 64 to an area that corresponds with the target area 112, as illustrated in FIGS. 11A and 11B. Doing so can improve the speed at which image processing routine 64 operates to align with user expectations and can, also, decrease the power consumption of controller 26 during a hitching operation.

In some implementations, including those wherein the valid zone 110 is not otherwise reduced (such as to limit swing out of vehicle 12, as discussed above), it may be useful to implement a target area 112 that is limited within the valid zone 110 to improve system 10 performance. Further, where additional controller 26 performance may be desired beyond that achieved by an already reduced target area 112, the ability to reduce target area 112 further may also be desired. Accordingly, variations of system 10 can limit the target area based on perception criteria. Such functionality can also improve performance of system 10 during use of operating routine 68 by reducing the likelihood that an error in detecting coupler 14 results in system 10 aborting during backing. As shown in FIG. 12, such situations can arise from the ability of system 10 to accurately detect a coupler 14 at increased distance from vehicle 12. Notably, system 10 may accurately identify a trailer 16 at a high distance from vehicle 12 (e.g. about 5.5 meters), but due to image resolution limitations and/or the effect of adverse conditions, may identify an erroneous position 28e of coupler 14 (instead, for example, misidentifying another portion of trailer 16 as the coupler). Such a situation may result in the actual coupler 14 moving into an unreachable position (i.e., outside of acceptable zone 110) as vehicle 12 moves closer to trailer 16. Because image processing routine 64 is still employed to track coupler 14 during reversing, and because the accuracy of image processing routine 64 improves with distance, a subsequent correct identification of the position 28c of coupler 14 and a determination that the coupler 14 is outside of the acceptable zone 110 can cause system 10 to abort the execution of operating routine 68. In some implementations, it may be desired to prevent system 10 from beginning a hitching operation that it cannot finish. Accordingly, it may be desired to limit the target area 112 according to system perception as a function of distance from vehicle 12. In this manner, a method 300 for deriving the present target area 112 can include defining 310 the steering limits L1,L2, as discussed above, and then providing reduced boundaries B1,B2 that limit the target area 112 laterally to an area within the valid zone 110 as a function of distance. As discussed above, the target area 112 can be reduced longitudinally by applying the maximum perception distance R1 (step 314) and minimum travel distance R1 (step 316) as also discussed above. The result is the target area 112 searched by the image processing routine 64 (step 318).

Figure 14:
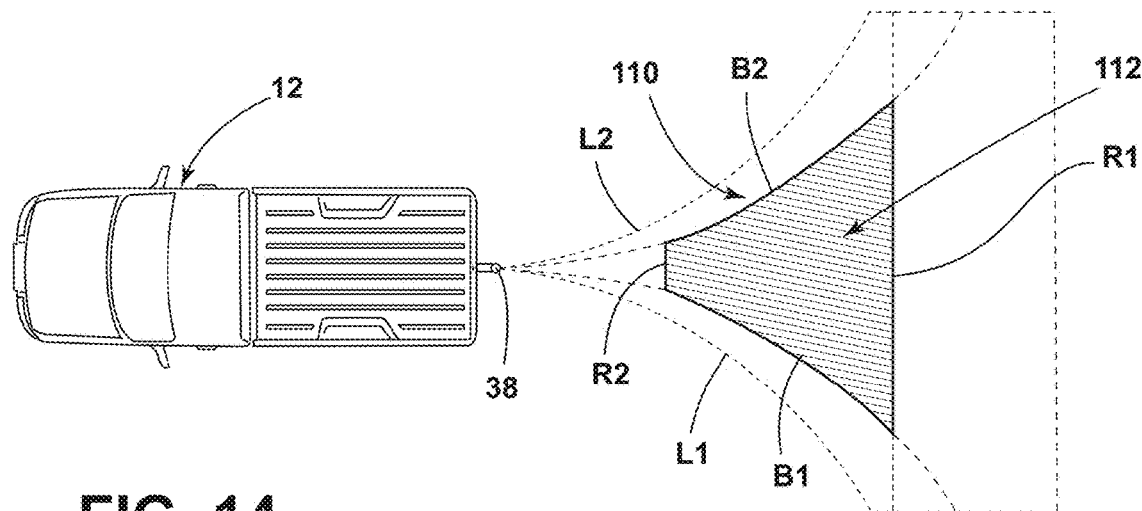
FIG. 14 is an overhead schematic depiction of a trailer target area achieved by the process of FIG. 13.
Figure 15:
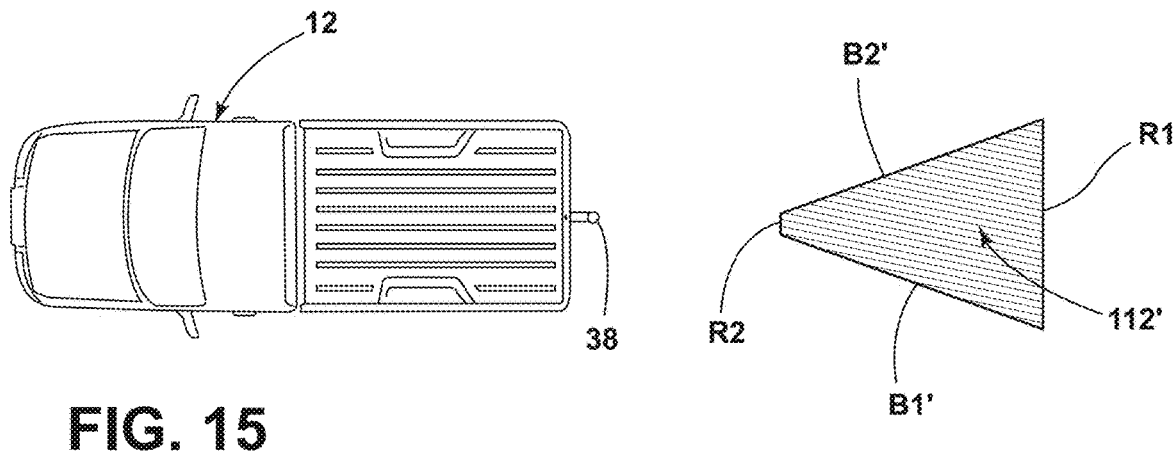
FIG. 15 is an overhead schematic depiction of an alternative trailer target area that can achieved by the process of FIG. 13.

As shown in FIG. 14, it can be appreciated that the lateral vehicle steering limits L1,L2 are a function of distance from vehicle 12. Accordingly, in one implementation, the lateral boundaries B1,B2 of target area 112 can be determined as the lateral vehicle steering limits L1,L2 limited by an operating angle $\delta_{op}$ that is lower than maximum steering angle $\delta_{max}$. The difference between the operating angle $\delta_{op}$ and the maximum steering angle my vary based on criteria that can be selected to optimize or improve the performance of system 10, to address various constraints on the operation of system 10, or to increase the predictability or reliable performance of system 10, as discussed above. As shown in FIG. 15, the target area 112 can be further limited after a determination of the boundaries B1,B2 by geometric simplification or the like to introduce an additional error margin or to further lower the computational load of system 10.

Figure 16:
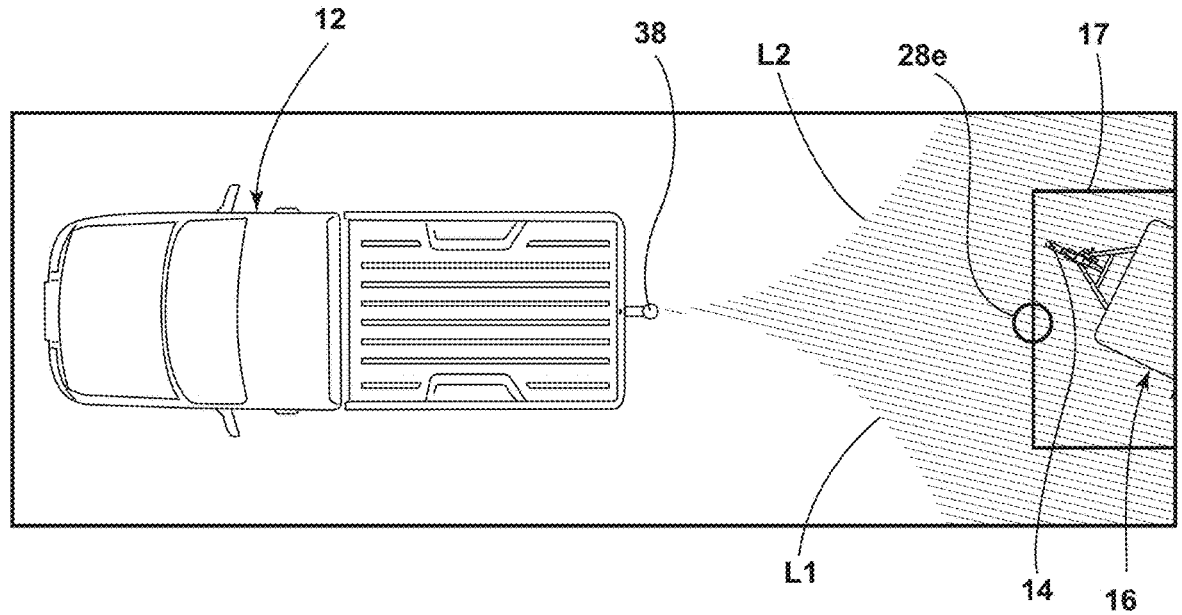
FIG. 16 is an overhead schematic depiction of a further erroneous coupler detection.
Figure 17:
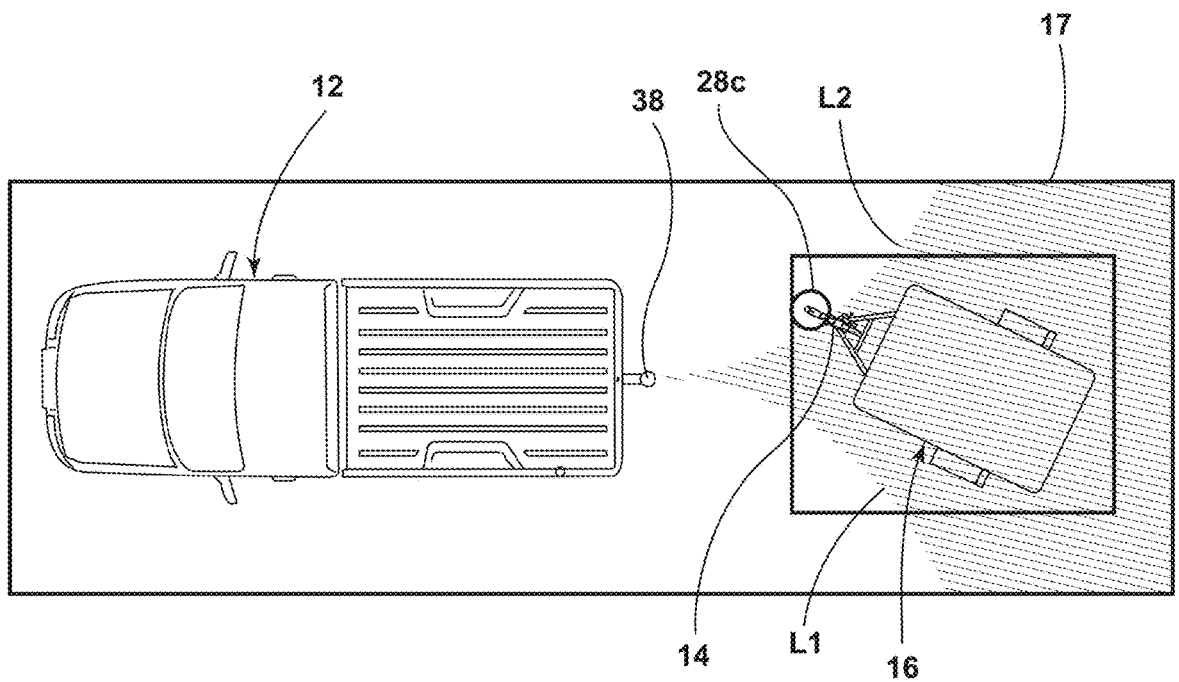
FIG. 17 is an overhead schematic depiction of the erroneous coupler detection of FIG. 16 resulting in a vehicle coupler becoming unreachable in a further example of a reversing maneuver.
Figure 18:
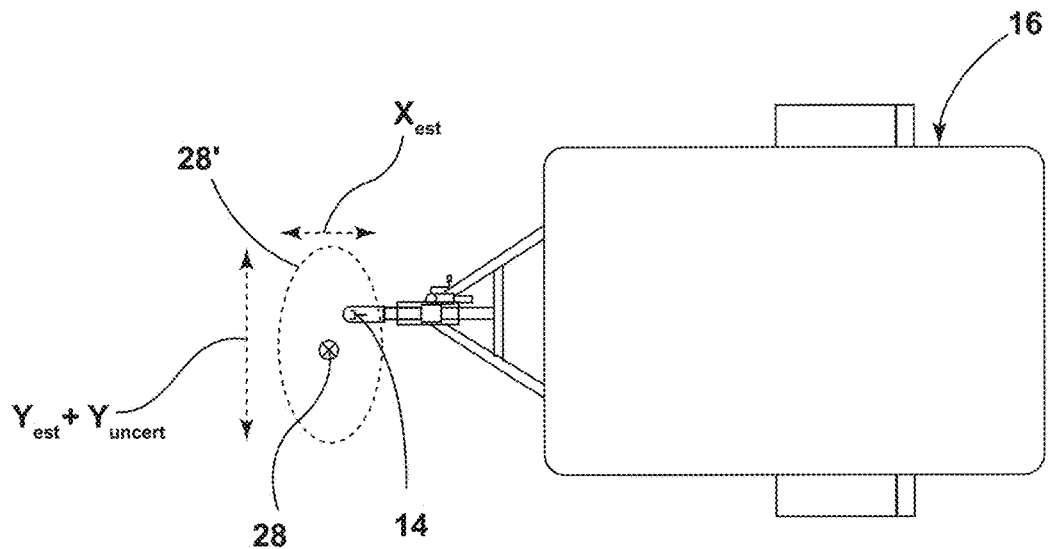
FIG. 18 is a schematic depiction of an uncertainty range for coupler detection that can account for uncertainty in coupler detection to reduce the effects of erroneous coupler detection.
Figure 19:
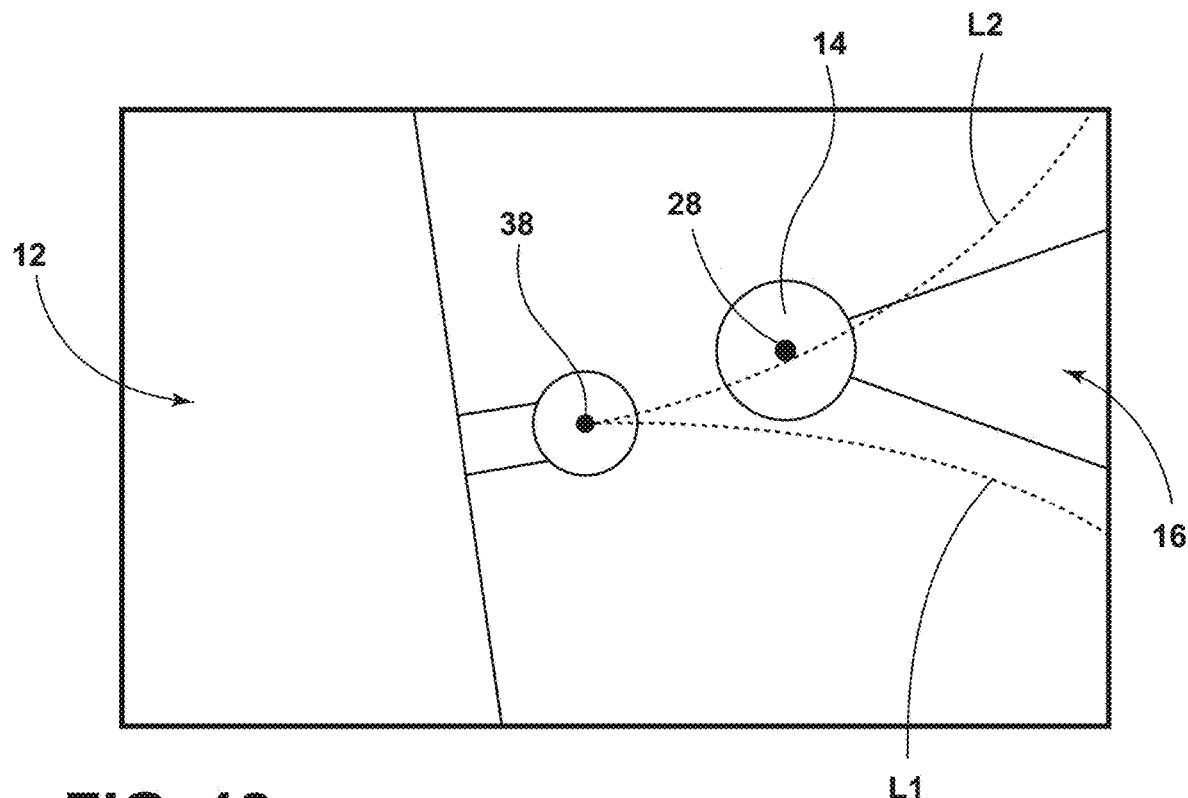
FIG. 19 is a schematic depiction of a trailer coupler moving out of an acceptable zone under conditions wherein a reversing operation may still be completed.

As shown in FIGS. 16 and 17, an inaccuracy in the detection of coupler 14, in a similar manner to that which is discussed above with respect to FIG. 12, can result in an erroneous position 28e and an inaccuracy in path 32 that makes reaching coupler 14 not possible by positioning vehicle 12 such that coupler 14 is out of the acceptable zone 110 when coupler 14 is accurately detected (such as by continued approach to trailer 16, a change in conditions, or the like) and the correct position 28c fed into the operating routine 68. In this manner, in addition, or as an alternative, to restricting the target area 112 system 10 can assign an uncertainty range at or around the detected coupler 14 location 28 to arrive at a modified coupler location 28' such that the entire modified coupler location 28' is required to be positioned within the valid zone 110 for system 10 to begin or maintain an automated hitching operation. In this respect, the ability for system 10 to begin an automated hitching maneuver when a potentially inaccurate location of coupler 14 has been determined, so long as the determined location 28' is acceptably within the valid zone 110. In this manner, an automated hitching maneuver can begin, as described above, with the driver positioning the vehicle 12 relative to trailer 16. In one implementation, system 10 can require that the trailer 16 be positioned within a target area 112, as determined according to any of the criteria or processes discussed above for the system 10 to first identify the trailer 16. Subsequently, system 10 identifies a portion of the trailer 16 that may be the coupler 14 within a preset level of accuracy. To provide generally acceptable performance for system 10 when requiring a level of accuracy that accepts some uncertainty, the above-described uncertainty range is applied over the determined coupler location 28 to arrive at the modified coupler location 28'. In this respect, an additional calculation can be made (for example, within image processing routine 64) that determines a size for the modified coupler location 28' appropriate for the given situation. The calculation may involve one or more considerations including, but not limited to, signal noise, the stability of the tracked position of coupler 14, coupler 14 position rate change, data fusion discrepancy (e.g. due to the combined use of radar data and image data 55 from camera 48), coherence with dead-reckoned position, the distance to the coupler 14, environmental metrics (e.g. ambient lighting), known historical performance, vehicle 12 speed, a terrain unevenness metric, the number of tracked points, any detected separation between tracked points and untracked points, tracked contour resolution, the existence of multiple potential targets, or the like.

In one aspect, where system 10 is configured to determine if the trailer coupler position as reported by the sensing system is reachable based on the minimum possible turn radius of the vehicle 12 (i.e., when system 10 is configured to require a coupler 14 position within the valid zone 110 between steering limits L1,L2), the lateral uncertainty of the trailer coupler position estimation, derived by controller in executing image processing routine 64, as discussed above, can also be considered as an additional criteria to account for potential errors in determining coupler 14 position. In this manner, system 10 can reduce instances were a hitching operation is aborted when coupler 14 detection accuracy improves during the operation, resulting in a coupler 14 position outside of the valid zone 110, as shown in FIGS. 16 and 17. In making such a determination, system 10 can run the operating routine 68 with the trailer coupler 14 positon 28 defined as $x_{tc}, y_{tc}$ according to the following:

$$x_{tc} = |x_{est}|, \text{ and} \tag{10}$$

$$y_{tc} = |y_{est}| + y_{uncert}, \tag{11}$$

where:

$x_{est}$ is the estimated longitudinal positon of the trailer coupler;

$y_{est}$ is the estimated lateral position of the trailer coupler; and $y_{uncert}$ is the lateral portion of the uncertainty ellipse.

Using $x_{tc}$ and $y_{tc}$, the straight-line distance $D_c$ between the coupler 14 and hitch ball 38 and the angle $\theta_c$ between them can be calculated as follows:

$$D_c = \sqrt{y_{tc}^2 + x_{tc}^2}, \text{ and} \tag{12}$$

$$\theta_c = \tan^{-1} \frac{y_{tc}}{x_{tc}}. \tag{13}$$

Assuming the host vehicle turns at its minimum turn radius $\rho$, the associated turn radius $\rho_{hb}$ of the hitch ball 34, and the angle $\theta_1$ can be found according to the following:

$$\rho_{hb} = \sqrt{\rho^2 + L^2}, \text{ and} \tag{14}$$

$$\theta_1 = \tan^{-1} \frac{\rho}{L}. \tag{15}$$

Equations (14) and (15) can then be used to give an expression for the distance C from the vehicle turn center xc,yc to the trailer coupler 14, as follows:

$$C^2 = \rho_{hb}^2 + D^2 - 2\rho_{hb} D \cos \theta_2, \text{ and} \tag{16}$$

$$\theta_2 = \pi - \theta - \theta_1. \tag{17}$$

According to the above, for the trailer coupler 14 to be in the valid zone the turn center to coupler 14 distance C must be greater than $\rho_{hb}$. Therefore:

$$\rho_{hb}^2 \leq \rho_{hb}^2 + D^2 - 2\rho_{hb} D \cos \theta_2. \tag{18}$$

Simplifying equation (18) gives the following expression:

$$\cos \theta_2 \leq \frac{D}{2\rho_{hb}}. \tag{19}$$

Accordingly, system 10 can monitor the detected coupler 14 position 28 within the assigned uncertainty range during preparation for an automated hitching maneuver and during execution of the maneuver. If the expression in equation (19) is true, then the position 28 is valid and reachable by the vehicle 12. If this expression is false, then the position 28 is invalid, which system 10 can interpret as indicating a likelihood that the coupler 14 cannot be reached in a single reversing maneuver. If a false result is obtained during the process of positioning vehicle 12 relative to trailer 16 to begin a hitching operation, the system 10 takes the result as indicating that the vehicle 12 needs to be better positioned relative to trailer 16 for the operation to begin. In such an instance, the system 10 can continue to indicate that no trailer 16 has been detected (indicating that additional movement of vehicle 12 is needed to improve the positioning) or can indicate that a trailer 16 has been located but is still out of range. As discussed above, because the ability of system 10 to accurately identify coupler 14 improves as vehicle 12 approaches trailer 16 during the automated hitching maneuver, the modified location 28 (including the uncertainty zone, which may also decease as vehicle 12 approaches trailer 16) of coupler 14 may move out of the valid zone 110 during the hitching operation. Notably, the addition of the uncertainty range to the position 28 of coupler 14 may minimize such occurrences; however, instances where, for example, a portion of trailer 16 is erroneously identified as the coupler 14, which may still lead to the actual coupler 14 being positioned outside of the valid zone 110 during a hitching operation. In such situations, system 10 can abort the hitching operation and can indicate to the user that the hitching operation has been canceled and that the vehicle 12 needs to be repositioned before restarting the operation.

Figure 20:
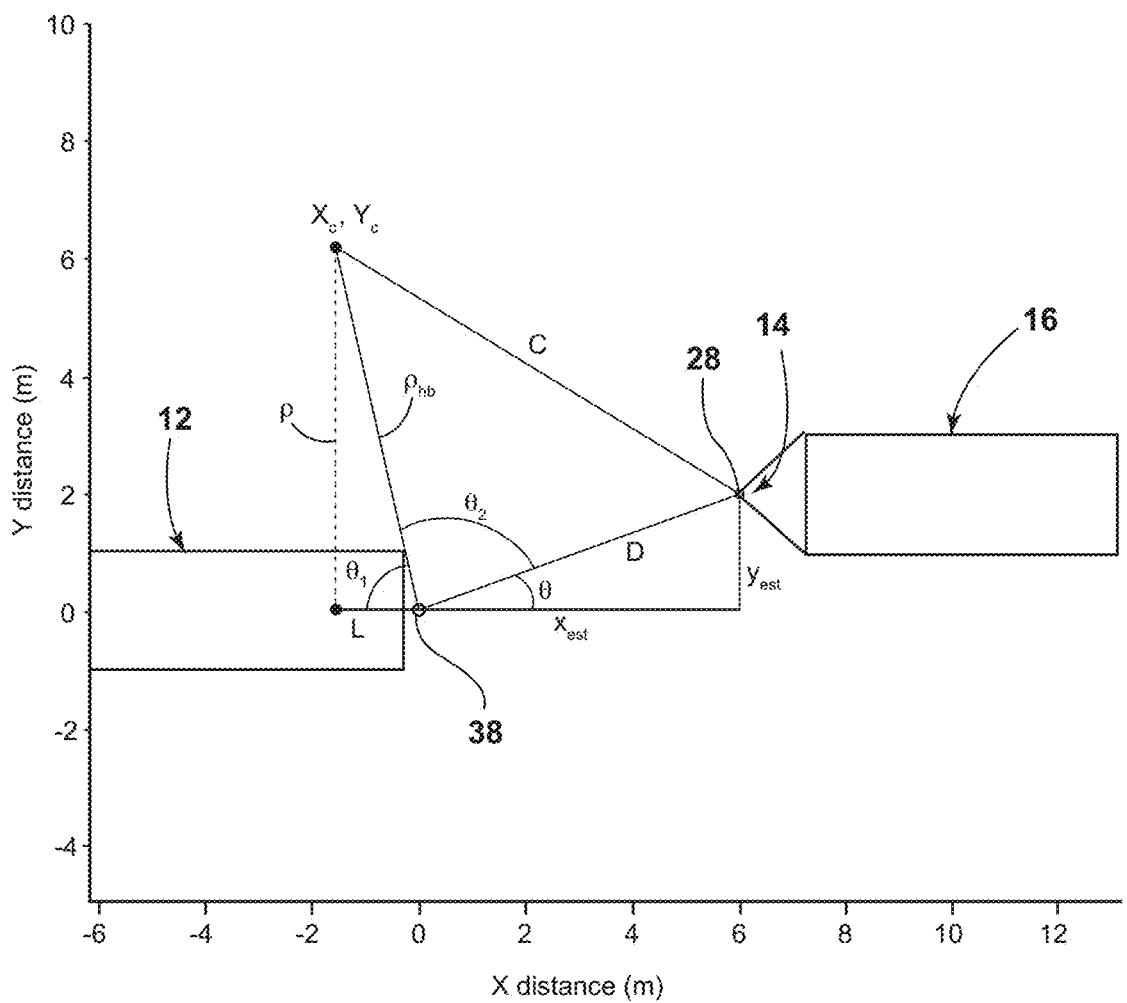
FIG. 20 is a diagram showing geometry related to coupler position monitoring with respect to an acceptable zone.

In an additional aspect illustrated in FIG. 20, system 10 can stop tracking the position 28 of coupler 14 relative to the valid zone 110 when the target distance $D_c$ falls below a threshold value. Because the valid zone 110 originates from the hitch ball 38, the valid zone 110 narrows significantly close to hitch ball 38. In many instances, the coupler 14 may be acceptably aligned with hitch ball 38 at the end of a hitching maneuver (relative to user expectations and/or with the ability to lower coupler 14 onto hitch ball 38 with only slight manual adjustment) that, nevertheless technically, places coupler 14 outside of the valid zone 110. Accordingly, it is preferable that the system complete the maneuver, with a small amount of permitted misalignment, rather than aborting the entire maneuver. In one example, system 10 can cease requiring that the coupler 14 position 28 is within the valid zone 110 when the vehicle 12 moves toward trailer 16 such that the coupler 14 is within the minimum distance threshold R2 (e.g., about 1 m) of hitch ball 38. Such functionality may help achieve acceptable alignment of hitch ball 38 with coupler 14 while reducing instances where the hitching operation is aborted at close distances.

Figure 21:
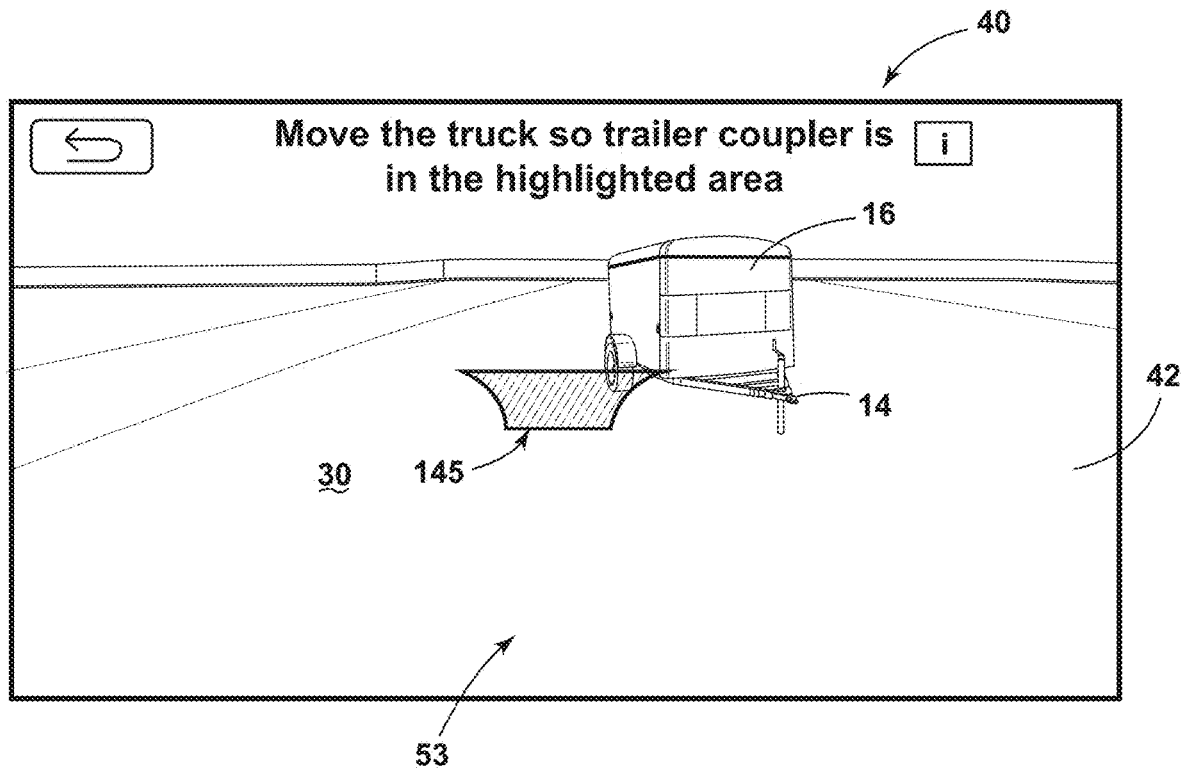
FIG. 21 is a depiction of an image received from a vehicle camera during an alignment sequence step with a target image overlaid thereon.
Figure 22:
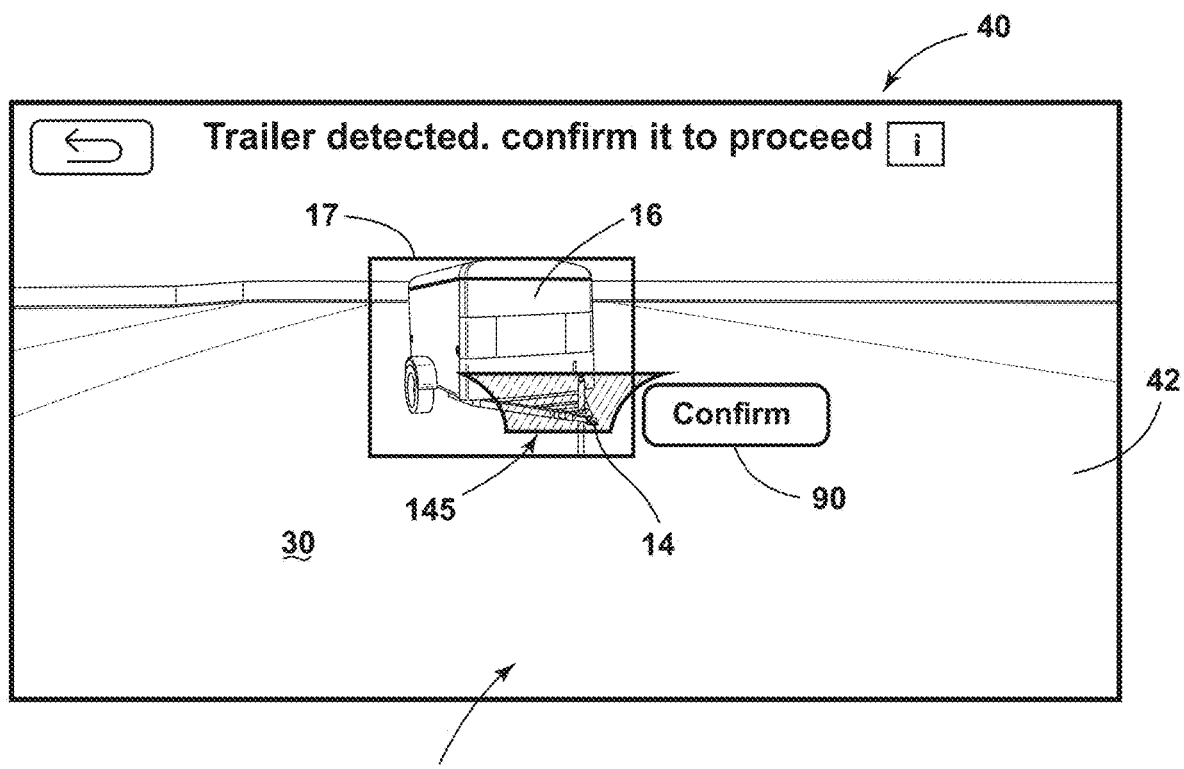
FIG. 22 is a depiction of a subsequent image received from a vehicle camera during a subsequent alignment sequence step with the target and additional information overlaid thereon.
Figure 23:
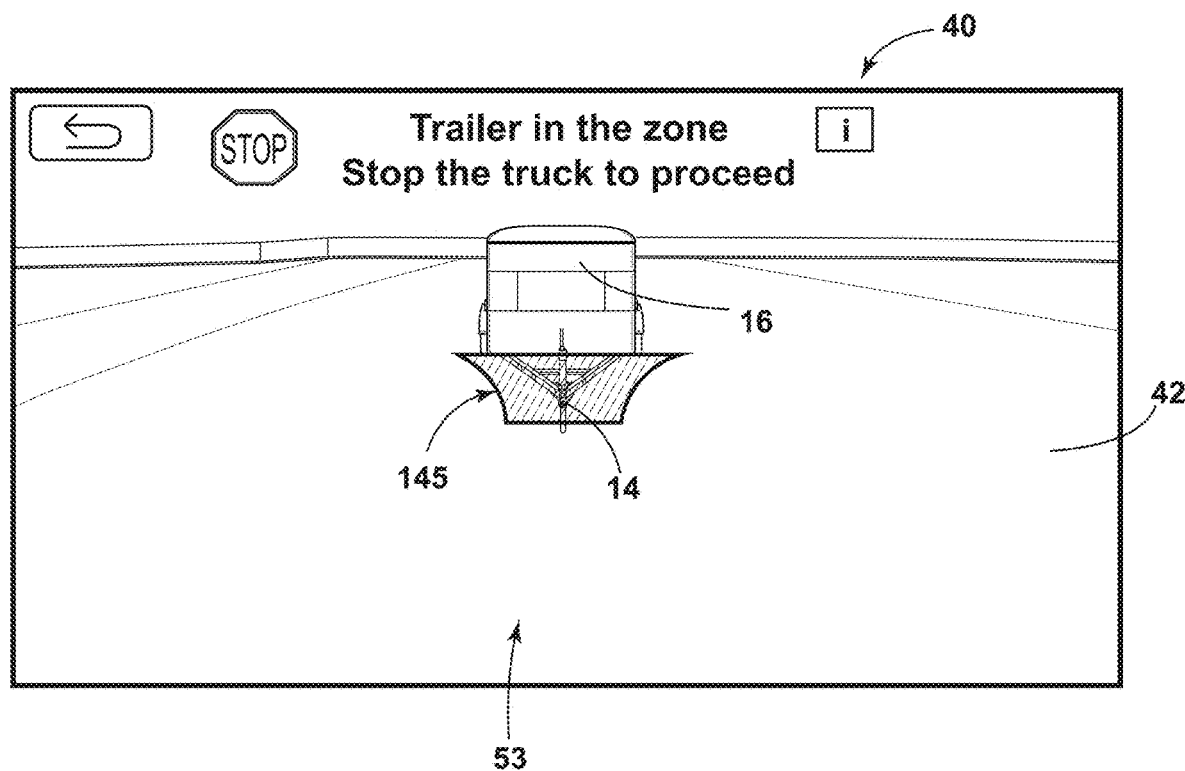
FIG. 23 is an alternative further depiction of a subsequent image received from a vehicle camera during an alternative subsequent alignment sequence step with the target and additional information overlaid thereon.

Turning now to FIGS. 21-23, to ensure positioning of vehicle 12 relative to trailer 16 according to the various derivations and uses of target area 112 discussed above, system 10 can be generally configured to direct the user to position vehicle 12 relative to trailer 16 such that trailer 16 (or coupler 14) is within such a target area 110 of the field of view of the utilized cameras, such as field of view 49 of rear camera 48, and the corresponding image data 55. As shown in FIG. 6, system 10 can communicate the positioning of coupler 14 relative to vehicle 12 by way of presenting target area 110 as a graphical overlay on a real-time video image 53 of the image data 55 from one or more of the cameras 48,50,52a,52b in imaging system 18 presented on screen 44. The target area 110 depiction may be derived and/or presented on screen 44 according to various characteristics of system 10 described above and may balance these characteristics and system requirements to provide widely useable functionality of system 10, overall. In this manner, the target area 110, as determined above can be positioned within the image 53 in a location that is determined to correspond with an actual location relative to vehicle 12 relative to the ground plane 30 on which vehicle 12 is positioned (and on which trailer 16 may be assumed to be present, regardless of actual ground characteristics) that is within the actual target area 112 for trailer 16 and coupler 14 detection and vehicle 12 navigation for alignment therewith.

The target area 110 may be graphically depicted as a graphic target 145 that may correspond with the actual valid zone 110 for trailer 16 and coupler 14 positioning relative to vehicle 12. In the examples above, wherein system 10 required positioning of the trailer 16 and/or coupler 14 within the target area 112 that is within and generally smaller than the valid zone 110, the target area 112 can be displayed as an area along the ground plane 30 that is within both the longitudinal range and the lateral range, illustrated in the various examples above, which is shown in FIGS. 21-23 as an area 112 bounded by respective portions of the longitudinal limits R1,R2 and the lateral boundaries B1,B2. In such an example, the target 145 can be presented on screen 44 as an overlay on the video image 53 displayed using the image data 55 that approximates the target area 112 on the image 53. In this manner, the respective portions of the ranges R1,R2,B1,B2 bounding the target area 112 can be graphically represented on screen 44 in a manner that correlates the target area 112 on the actual ground plane 30 with the view on the screen 44 based on the properties of camera 48, for example, and the position thereof to arrive at a perspective projection of the target area 112 that at least reasonably appears as an area of the ground visible on the screen 44. In this manner, the user may position vehicle 12 such that the subject trailer is within the target 145 corresponding with the target area 112. In an example, once such positioning is achieved and system 10 detects at least trailer 16 within the target area 112 or aligned with target 145, the an indication can be given to the user and system 10 can either seek confirmation of the identified coupler 14 or proceed with the hitching operation, as described below. In other examples, the target image 145 may approximate the target area 112, including by representing an actual target or projected vertical area within image 53 such that the trailer 16 can be aligned with the target image 145 for proper initial alignment.

As shown in FIG. 21, in one operating scheme, when initiated, system 10 can automatically attempt to identify a trailer 16 within the area of target 145 while prompting the driver to position vehicle 12 such that the coupler 14 and/or trailer 16 is within the area of target 145. When a trailer 16, including its coupler 14, are detected (which would generally coincide with positioning thereof within the area of target 145, system 10 can indicate such an identification, as discussed above, by highlighting the trailer with box 17 (FIG. 22), while instructing the driver to confirm (by pressing button 90, for example) to confirm that the desired trailer 16 has been identified. At which point, vehicle 12, according to various potential interactive schemes, can acquire control of vehicle 12 from the user and can control vehicle 12 in aligning hitch ball 34 with coupler 14 for hitching of vehicle 12 with the trailer 16. Alternatively, as shown in FIG. 23, system 10 can alert the user when proper alignment of coupler 14 within the target area 112 has been achieved and instruct the user to stop the vehicle to begin the hitching operation.

Figure 24:
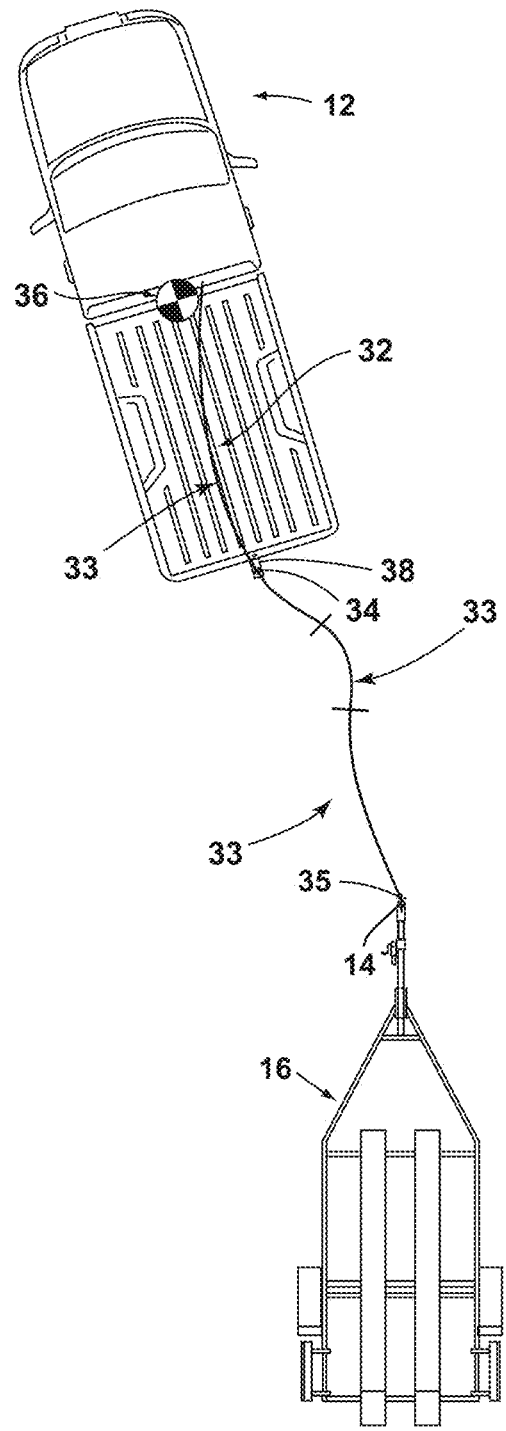
FIG. 24 is an overhead schematic view of the vehicle during a subsequent step of the alignment sequence with the trailer.
Figure 25:
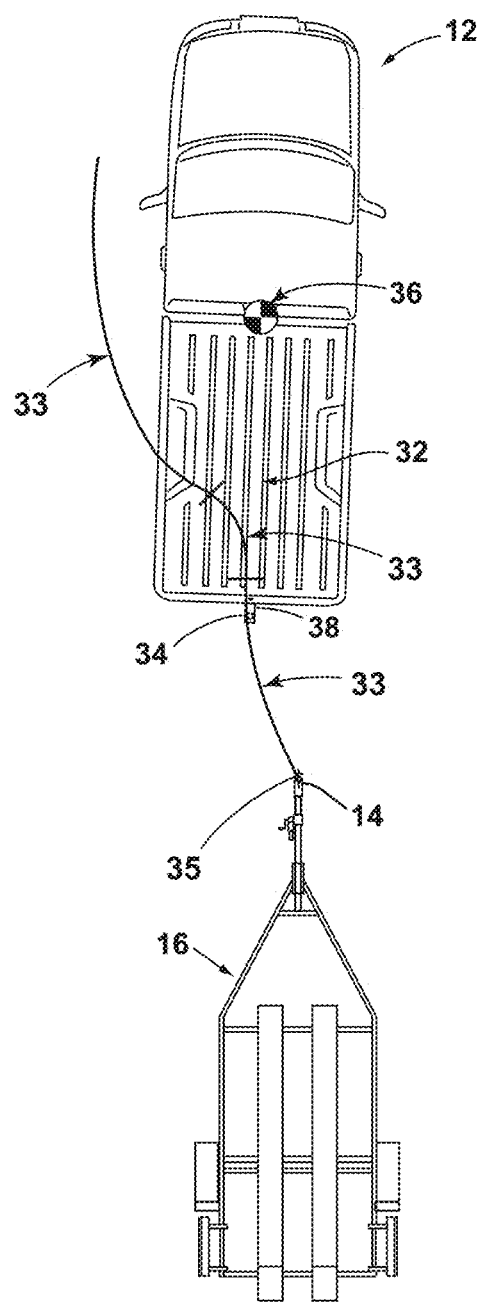
FIG. 25 is an overhead schematic view of the vehicle during a subsequent step of the alignment sequence with the trailer.
Figure 26:
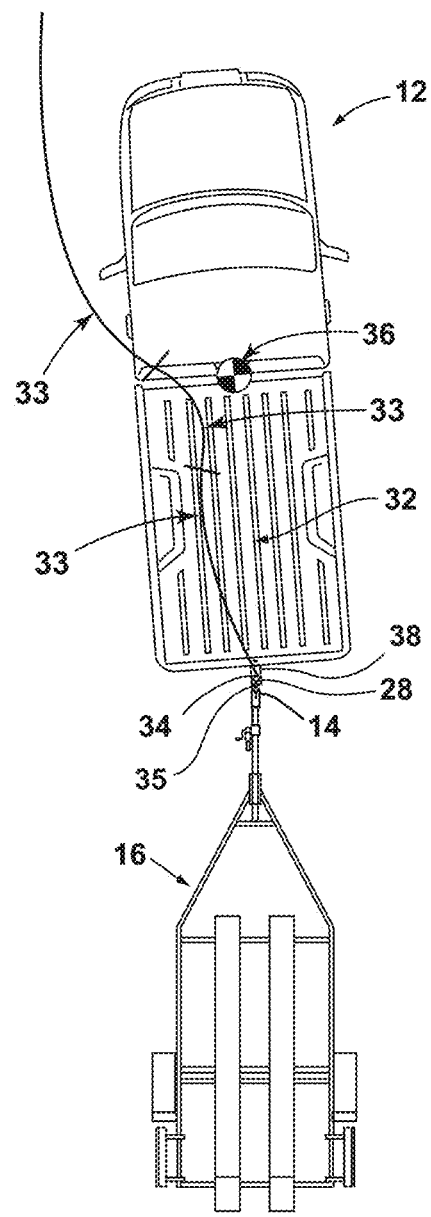
FIG. 26 is an overhead schematic view of the vehicle during a subsequent step of the alignment sequence with the trailer and showing the position of a hitch ball of the vehicle at an end of a derived alignment path.

Turning now to FIGS. 24-26, once the trailer 16 and coupler 14 have been identified, and system 10 determines the path 32 to align hitch ball 34 with the coupler 14, the operating routine 68 may continue to control vehicle 12 until hitch ball 34 is in the desired endpoint 35 relative to coupler 14 for coupler 14 to engage with hitch ball 34 when coupler 14 is lowered into horizontal alignment therewith. In the example discussed above, image processing routine 64 continuously monitors the positioning $D_c,\alpha_c$, of coupler 14, constantly or once available, during execution of operating routine 68, including as coupler 14 comes into clearer view of rear camera 48 with continued movement of vehicle 12 along path 32, as shown in FIG. 25. As discussed above, the position of vehicle 12 can also be monitored by dead reckoning device 24 with the position 28 of coupler 14 being continuously updated and fed into path derivation routine 66 in case path 32 and or endpoint 35 can be refined or should be updated (due to, for example, improved height $H_c$, distance $D_c$, or offset angle ct, information due to closer resolution or additional image data 55), including as vehicle moves closer to trailer 16, as shown in FIG. 25. Still further, the coupler 14 can be assumed to be static such that the position of vehicle 12 can be tracked by continuing to track the coupler 14 to remove the need for use of the dead reckoning device 24. In a similar manner, a modified variation of operating routine 68 can progress through a predetermined sequence of maneuvers involving steering of vehicle 12 at or below a maximum steering angle $\delta_{max}$, while tracking the position $D_c$, $\alpha_c$, of coupler 14 to converge the known relative position of hitch ball 34 to the desired position 38d thereof relative to the tracked position 28 of coupler 14, as discussed above and shown in FIG. 26.

Figure 27:
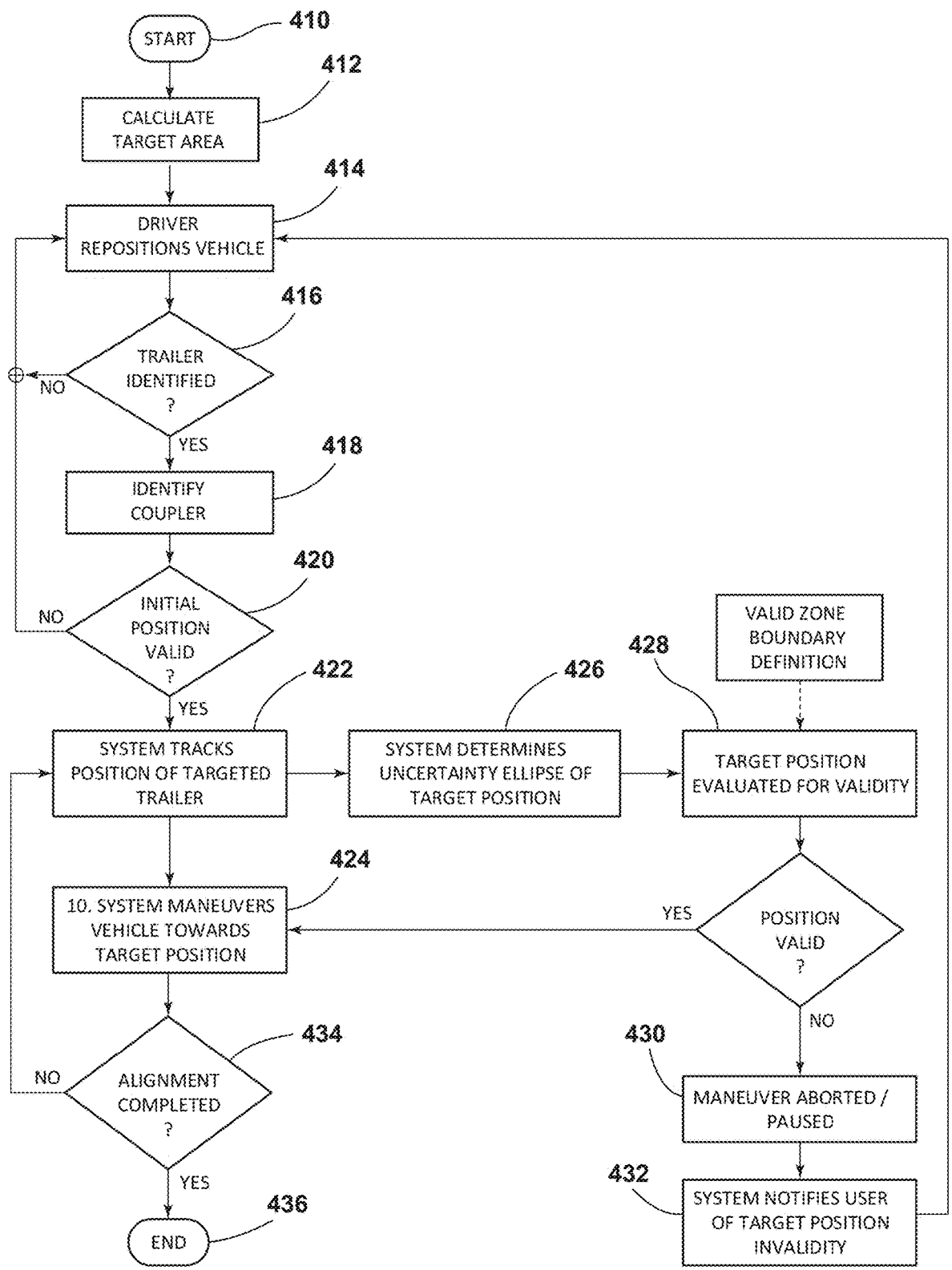
FIG. 27 is a flowchart depicting steps in an example of the alignment sequence.

Turning now to FIG. 27, a flowchart showing steps in one operating scheme 400 for using hitch assist system 10 to align a vehicle hitch ball 34 with a trailer coupler 14 is shown. In particular, in step 410 the hitch assist system 10 is initiated. Once the hitch assist system 10 is initiated 410, the system retrieves the relevant information from memory 62 and calculates the target area 112 within the valid zone 110 for initial vehicle 12 and trailer 16 positioning (step 412). The target area 112 can be determined according to either or a combination of the processes discussed above. The driver is then instructed (e.g., via HMI 40, as discussed above with respect to FIGS. 21-23) to position the vehicle 12 such that the subject trailer 16 is in the target area 112 (step 214). Controller 26 then uses imaging system 18 to scan the viewable scene using any or all available cameras 48, 50, 52a, 52b (step 212). The scene scan can be used to then identify (step 416) any trailers 16 and/or couplers 14 within the image data 55. As discussed above, the scan can be restricted to the target area 112 or a similarly-limited area within image data 55. In this manner, the scene scan continues until a trailer 16 is identified within the target area 112, and the user may proceed using target 145 on vehicle HMI 40 until the desired trailer 16 is identified, which may be then confirmed by the user.

Once the trailer 16 is identified, the coupler 14 is identified (step 418) and system 10 determines if the coupler 14, as identified, is within the valid zone 110. If no coupler can be identified, controller may proceed using the location of the identified trailer 16 until a coupler 14 can be identified. If the coupler 14 can be identified, it can then be determined 420 if the coupler 14 is within the valid zone 110. If coupler 14 is not in the valid zone 110, system 10 can, again, instruct (step 414) the user to reposition vehicle 12 accordingly, as discussed above. If coupler 14 is within the valid zone 110, system 10 can use the image data 55 to track the position 28 of the coupler 14 (step 422) and use the path derivation routine 66 and operating routine 68 to maneuver the vehicle 12 toward the coupler 14 location 28 (step 424). As discussed above with reference to FIGS. 17-20, when the coupler 14 position 28 has been identified, controller 26 can also determine and assign an uncertainty zone to the coupler position 28 (step 426) and evaluate the modified coupler position 28' for positioning within the valid zone 110 (step 428). In this manner, if the modified coupler position 28' is initially out of the valid zone 110 or moves out of the valid zone 110 during maneuvering of vehicle (step 424), the maneuver can be aborted or paused (step 430), depending on system 10 settings or the like, with the user notified (step 432) that the coupler 14 is out of range and that the vehicle 12 needs to be repositioned (step 414).

As long as the modified coupler 14 position 28' remains within the valid zone 110, system 10 continues to control steering system 20 to maintain vehicle 12 along path 32 as controller 26 controls the velocity of vehicle 12 using powertrain control system 72 and braking control system 70. As discussed above, controller 26 can control steering system 20, while tracking the position $D_c$, $\alpha_c$ of coupler 14 until vehicle 12 reaches endpoint 35 (step 434), wherein the vehicle 12 hitch ball 34 reaches the desired position $38_d$ for the desired alignment with coupler 14. As noted above, the modified coupler position 28' tracking (steps 426-432) can be canceled or suspended when vehicle 12 is within a predetermined distance Dc from the coupler 14 location 28. When controller 26 determines that hitch ball 38 is within a predetermined distance of coupler 14, controller can slow the vehicle to a stop by controlling brake system 70 (which can be done progressively as vehicle 12 approaches such a point). When the vehicle 12 is aligned with coupler 14 and vehicle 12 is brought to a stop, operating routine 68 can end (step 436). Vehicle 12 can then be driven normally with system 10 remains idle until a reactivation input is received, at which point the above-described method restarts (step 410).

It is to be understood that variations and modifications can be made on the aforementioned structure without departing from the concepts of the present disclosure, and further it is to be understood that such concepts are intended to be covered by the following claims unless these claims by their language expressly state otherwise.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the disclosure as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

What is claimed is:

1. A hitching assistance system for a vehicle, comprising:
   a vehicle steering system including a steering motor operably coupled with steered wheels of the vehicle;
   an imaging system outputting image data; and
   a controller:
   determining a trailer target area to a rear of the vehicle, the trailer target area being:
   positioned within left and right lateral limits of the vehicle steering system;
   defined in a lateral direction between left and right boundaries respectively spaced inwardly of the left and right lateral limits by one of an imaging system perception factor or a vehicle geometry factor; and
   defined in a longitudinal direction between a minimum movement limit and a maximum perception limit;
   identifying a coupler of a trailer in the image data, the coupler being within the trailer target area; and
   controlling the vehicle steering system to cause the steering motor to steer the steered vehicle wheels to move a hitch ball of the vehicle into alignment with the coupler during reversing movement of the vehicle.

2. The system of claim 1, wherein the controller further controls the vehicle steering system to cause the vehicle to steer to align the hitch ball of the vehicle with the coupler during movement of the vehicle in a single reversing maneuver.

3. The system of claim 1, wherein the left and right lateral limits of the vehicle steering system are equal to left and right steering path limits of the vehicle.

4. The system of claim 1, wherein the left and right boundaries respectively spaced inwardly of the left and right lateral limits of the vehicle steering system by the vehicle geometry factor by the left and right boundaries being defined along straight left and right vehicle backing paths at respective left and right vehicle heading angles corresponding with respective left and right swingout limits for the vehicle.

5. The system of claim 4, wherein the left and right swingout limits are of equal distances on opposite lateral sides of a centerline of the vehicle.

6. The system of claim 4, wherein the left and right swingout limits are based on a front corner position of the vehicle relative to a steering center of the vehicle at a maximum steering angle of the vehicle steering system.

7. The system of claim 4, wherein the left and right swingout limits are adjustable.

8. The system of claim 4, wherein the left and right swingout limits are determined by the controller using data from one or more proximity sensors associated with the vehicle.

9. The system of claim 1, wherein the left and right boundaries respectively spaced inwardly of the left and right lateral vehicle steering limits by the imaging system perception factor by the left and right boundaries corresponding with left and right steering paths at a steering angle less than a maximum steering angle by a predetermined factor.

10. The system of claim 9, wherein the predetermined factor is determined to reduce a computational load on the controller during at least one of identifying the coupler of the trailer and controlling the vehicle steering system.

11. The system of claim 1, wherein:
the imaging system is mounted with and directed toward the rear of the vehicle,
the controller further acquires the image data from the imaging system; and
the trailer target area is identified within the image data and is less than a total field of the image data.

12. The system of claim 11, wherein:
the maximum perception limit corresponds with a limit of the controller in identifying the coupler within the image data; and
the minimum movement limit corresponds with a distance over which the vehicle must move to cause the vehicle to steer to align the hitch ball of the vehicle with the coupler during movement of the vehicle.

13. The system of claim 11, wherein the controller further outputs a video image displayable on a human-machine interface within the vehicle including:
an image to the rear of the vehicle within the image data; and
a graphic overlay of the target area on the image data in a proportionally correlated manner with the image data.

14. The system of claim 13, wherein the graphic overlay further includes an indication of whether a detected coupler is within the target area.

15. The system of claim 1, wherein while outputting the steering signal to the vehicle to cause the vehicle to steer to align the hitch ball of the vehicle with the coupler during movement of the vehicle, the controller:
monitors a position of the coupler to determine if the coupler moves to a position beyond either of the left or right vehicle steering limits; and
stops the vehicle if the coupler moves to a position beyond either of the left or right vehicle steering limits when a distance to the coupler is above a predetermined threshold.

16. A hitching assistance system for a vehicle, comprising:
a vehicle steering system including a steering motor operably coupled with steered wheels of the vehicle;
a vehicle brake system;
an imaging system outputting image data; and
a controller:
identifying a coupler of a trailer in the image data within an acceptable trailer zone to the rear of the vehicle, the acceptable trailer zone being applied to the image data and being smaller than a total field of the image data; and
outputting a steering signal to the vehicle steering system to cause the steering motor to steer the steered vehicle wheels to move a hitch ball of the vehicle into alignment with the coupler during movement of the vehicle, including:
monitoring a position of the coupler in the image data to determine if the coupler moves to a position relative to the vehicle that is beyond either of a left or a right limit of the vehicle steering system; and
controlling the vehicle brake system to stop the vehicle if the coupler moves to a position beyond either of the left or right vehicle steering limits.

17. The system of claim 16, when the controller only stops the vehicle if the coupler moves to a position beyond either of the left or right vehicle steering limits when a distance to the coupler is above a predetermined threshold.

18. The system of claim 16, wherein the position of the coupler within the image data is modified to include uncertainty zone related to an ability of the controller to determine the position of the coupler.

19. The system of claim 16, wherein the trailer coupler is further identified within a trailer target area within the acceptable trailer zone, the target area being:
defined in a lateral direction between left and right boundaries respectively spaced inwardly of the left and right lateral vehicle steering limits that define the acceptable trailer zone by one of a system perception factor or a vehicle geometry factor; and
defined in a longitudinal direction between a minimum movement limit and a maximum perception limit.

20. A method for assisting a vehicle in hitching with a trailer, comprising:
identifying a coupler of a trailer within image data received from an imaging system of the vehicle, the coupler further being located in a specified area relative to the vehicle, the specified area being applied to the image data and defined between a maximum distance and a minimum distance from a rear of the vehicle and boundaries respectively spaced inwardly of respective left and right lateral limits of a steering system of the vehicle including a steering motor operably coupled with steered wheels of the vehicle by one of a system perception factor or a vehicle geometry factor; and
outputting a steering signal to the vehicle steering system to cause the steering motor to steer the steered vehicle wheels to move a hitch ball of the vehicle into alignment with the coupler, including:
monitoring a position of the coupler to determine if the coupler moves to a position beyond either of the left or the right limit of the vehicle steering system; and
controlling a vehicle brake system to stop the vehicle if the coupler moves to a position beyond either of the left or right vehicle steering limits.

\* \* \* \* \*

UNITED STATES PATENT AND TRADEMARK OFFICE
CERTIFICATE OF CORRECTION

Page 1 of 1

PATENT NO.        : 11,208,146 B2
APPLICATION NO.   : 16/418116
DATED             : December 28, 2021
INVENTOR(S)       : Niewiadomski et al.

It is certified that error appears in the above-identified patent and that said Letters Patent is hereby corrected as shown below:

In the Claims

Column 25:
Claim 9, Line 7;
After "lateral" delete "vehicle steering".

Signed and Sealed this
Eighth Day of March, 2022

Drew Hirshfeld
*Performing the Functions and Duties of the*
*Under Secretary of Commerce for Intellectual Property and*
*Director of the United States Patent and Trademark Office*